(12) United States Patent
McMains et al.

(10) Patent No.: US 8,688,497 B2
(45) Date of Patent: Apr. 1, 2014

(54) SYSTEMS AND METHODS FOR DETERMINING PACK ALLOCATIONS

(75) Inventors: Teresa DePaola McMains, Sudbury, MA (US); Thomas Burkhardt, Cary, NC (US); Robert William Pratt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 87 days.

(21) Appl. No.: 12/987,495

(22) Filed: Jan. 10, 2011

(65) Prior Publication Data

US 2012/0179507 A1    Jul. 12, 2012

(51) Int. Cl.
*G06Q 10/00* (2012.01)
(52) U.S. Cl.
USPC .................. 705/7.25; 705/7.11; 705/7.12
(58) Field of Classification Search
USPC ....................... 705/7.25, 7.11, 7.12
See application file for complete search history.

(56) References Cited

U.S. PATENT DOCUMENTS

| | | | |
|---|---|---|---|
| 5,175,692 A | 12/1992 | Mazouz et al. |
| 5,195,172 A | 3/1993 | Elad et al. |
| 5,319,781 A | 6/1994 | Syswerda |
| 5,627,973 A | 5/1997 | Armstrong et al. |
| 5,652,842 A | 7/1997 | Siegrist, Jr. et al. |
| 5,712,989 A | 1/1998 | Johnson et al. |
| 5,767,854 A | 6/1998 | Anwar |
| 5,799,286 A | 8/1998 | Morgan et al. |
| 5,867,494 A | 2/1999 | Krishnaswamy et al. |
| 5,926,820 A | 7/1999 | Agrawal et al. |
| 5,946,662 A | 8/1999 | Ettl et al. |
| 5,953,707 A | 9/1999 | Huang et al. |
| 5,963,910 A | 10/1999 | Ulwick |
| 5,999,908 A | 12/1999 | Abelow |
| 6,009,407 A | 12/1999 | Garg |
| 6,014,640 A | 1/2000 | Bent |
| 6,023,684 A | 2/2000 | Pearson |
| 6,029,139 A | 2/2000 | Cunningham et al. |

(Continued)

FOREIGN PATENT DOCUMENTS

| | | |
|---|---|---|
| EP | 1413955 | 4/2004 |
| WO | 0111522 | 2/2001 |
| WO | 2007/002841 | 1/2007 |

OTHER PUBLICATIONS

"Advanced Merchandise Planning, Store Planning and Allocation" MID, Inc, 2010.*

(Continued)

*Primary Examiner* — Andre Boyce
*Assistant Examiner* — Renae Feacher
(74) *Attorney, Agent, or Firm* — Kilpatrick Townsend & Stockton LLP

(57) ABSTRACT

Systems and methods are provided for determining a distribution of each of a plurality of inner packs to a plurality of stores. Mismatch cost data and product demand data are received for the plurality of stores. A first inner pack quantity for distribution is determined based on the product demand data. A supply difference amount is determined, where the supply difference amount is a difference between the first inner pack quantity and the number of first inner packs available for distribution. A determination is made that adjusting the first inner pack quantity for the particular store based on the supply difference amount would have less effect on mismatch costs than other stores, and the first inner pack quantity is adjusted for the particular store based on the supply difference.

21 Claims, 14 Drawing Sheets

(56) References Cited

U.S. PATENT DOCUMENTS

| | | | |
|---|---|---|---|
| 6,041,267 A | 3/2000 | Dangat et al. | |
| 6,076,071 A | 6/2000 | Freeny, Jr. | |
| 6,078,892 A | 6/2000 | Anderson et al. | |
| 6,115,691 A | 9/2000 | Ulwick | |
| 6,119,102 A * | 9/2000 | Rush et al. | 705/29 |
| 6,151,582 A * | 11/2000 | Huang et al. | 705/7.25 |
| 6,175,876 B1 | 1/2001 | Branson et al. | |
| 6,182,060 B1 | 1/2001 | Hedgcock et al. | |
| 6,208,908 B1 | 3/2001 | Boyd et al. | |
| 6,226,623 B1 | 5/2001 | Schein et al. | |
| 6,236,977 B1 | 5/2001 | Verba et al. | |
| 6,237,138 B1 | 5/2001 | Hameluck et al. | |
| 6,249,768 B1 | 6/2001 | Tulskie et al. | |
| 6,263,315 B1 | 7/2001 | Talluri | |
| 6,275,812 B1 | 8/2001 | Haq et al. | |
| 6,286,005 B1 | 9/2001 | Cannon | |
| 6,321,133 B1 | 11/2001 | Smirnov et al. | |
| 6,321,206 B1 | 11/2001 | Honarvar | |
| 6,341,266 B1 | 1/2002 | Braun | |
| 6,341,269 B1 | 1/2002 | Dulaney et al. | |
| 6,397,224 B1 | 5/2002 | Zubeldia et al. | |
| 6,456,999 B1 | 9/2002 | Netz | |
| 6,470,344 B1 | 10/2002 | Kothuri et al. | |
| 6,484,179 B1 | 11/2002 | Roccaforte | |
| 6,502,077 B1 | 12/2002 | Speicher | |
| 6,526,526 B1 | 2/2003 | Dong et al. | |
| 6,546,135 B1 | 4/2003 | Lin et al. | |
| 6,553,352 B2 | 4/2003 | Delurgio et al. | |
| 6,560,501 B1 | 5/2003 | Walser et al. | |
| 6,581,068 B1 | 6/2003 | Bensoussan et al. | |
| 6,584,447 B1 | 6/2003 | Fox et al. | |
| 6,611,829 B1 | 8/2003 | Tate et al. | |
| 6,640,215 B1 | 10/2003 | Galperin et al. | |
| 6,643,659 B1 | 11/2003 | MacIssac et al. | |
| 6,728,724 B1 | 4/2004 | Megiddo et al. | |
| 6,735,570 B1 | 5/2004 | Lacy et al. | |
| 6,750,864 B1 | 6/2004 | Anwar | |
| 6,836,689 B2 | 12/2004 | Walser et al. | |
| 6,898,603 B1 | 5/2005 | Petculescu et al. | |
| 6,901,406 B2 | 5/2005 | Nabe et al. | |
| 6,907,382 B2 | 6/2005 | Urokohara | |
| 6,970,830 B1 | 11/2005 | Samra et al. | |
| 7,039,594 B1 | 5/2006 | Gersting | |
| 7,062,447 B1 | 6/2006 | Valentine et al. | |
| 7,068,267 B2 | 6/2006 | Meanor et al. | |
| 7,085,734 B2 | 8/2006 | Grant et al. | |
| 7,089,266 B2 | 8/2006 | Stolte et al. | |
| 7,092,896 B2 | 8/2006 | Delurgio et al. | |
| 7,092,918 B1 | 8/2006 | Delurgio et al. | |
| 7,130,811 B1 | 10/2006 | Delurgio et al. | |
| 7,133,876 B2 | 11/2006 | Roussopoulos et al. | |
| 7,133,882 B1 | 11/2006 | Pringle et al. | |
| 7,171,376 B2 | 1/2007 | Ramakrishnan | |
| 7,210,624 B1 | 5/2007 | Birjandi et al. | |
| 7,236,949 B2 | 6/2007 | Natan et al. | |
| 7,240,019 B2 | 7/2007 | Delurgio et al. | |
| 7,249,031 B2 | 7/2007 | Close et al. | |
| 7,251,615 B2 | 7/2007 | Woo | |
| 7,302,400 B2 | 11/2007 | Greenstein | |
| 7,302,410 B1 | 11/2007 | Venkatraman et al. | |
| 7,310,646 B2 | 12/2007 | Rangadass et al. | |
| 7,346,538 B2 | 3/2008 | Reardon | |
| 7,370,366 B2 | 5/2008 | Lacan et al. | |
| 7,379,890 B2 | 5/2008 | Myr et al. | |
| 7,395,255 B2 | 7/2008 | Li | |
| 7,440,903 B2 | 10/2008 | Riley et al. | |
| 7,505,482 B2 | 3/2009 | Adamczyk et al. | |
| 7,516,083 B1 * | 4/2009 | Dvorak et al. | 705/7.31 |
| 7,519,908 B2 | 4/2009 | Quang et al. | |
| 7,536,361 B2 | 5/2009 | Alberti et al. | |
| 7,617,119 B1 | 11/2009 | Neal et al. | |
| 7,668,761 B2 | 2/2010 | Jenkins et al. | |
| 7,689,456 B2 | 3/2010 | Schroeder et al. | |
| 7,747,339 B2 | 6/2010 | Jacobus et al. | |
| 7,752,067 B2 | 7/2010 | Fotteler et al. | |
| 7,756,945 B1 | 7/2010 | Andreessen et al. | |
| 7,798,399 B2 | 9/2010 | Veit | |
| 7,877,286 B1 | 1/2011 | Neal et al. | |
| 7,895,067 B2 | 2/2011 | Ramakrishnan | |
| 8,112,300 B2 | 2/2012 | Harper | |
| 2001/0047293 A1 | 11/2001 | Waller et al. | |
| 2002/0013757 A1 | 1/2002 | Bykowsky et al. | |
| 2002/0046096 A1 | 4/2002 | Srinivasan et al. | |
| 2002/0072953 A1 | 6/2002 | Michlowitz et al. | |
| 2002/0099678 A1 | 7/2002 | Albright et al. | |
| 2002/0107723 A1 | 8/2002 | Benjamin et al. | |
| 2002/0116237 A1 | 8/2002 | Cohen et al. | |
| 2002/0123930 A1 | 9/2002 | Boyd et al. | |
| 2002/0143669 A1 | 10/2002 | Scheer | |
| 2002/0169654 A1 | 11/2002 | Santos et al. | |
| 2002/0169655 A1 | 11/2002 | Beyer et al. | |
| 2002/0178049 A1 | 11/2002 | Bye | |
| 2002/0188499 A1 * | 12/2002 | Jenkins et al. | 705/10 |
| 2003/0023598 A1 | 1/2003 | Janakiraman et al. | |
| 2003/0028437 A1 | 2/2003 | Grant et al. | |
| 2003/0050845 A1 | 3/2003 | Hoffman et al. | |
| 2003/0078830 A1 | 4/2003 | Wagner et al. | |
| 2003/0083924 A1 | 5/2003 | Lee et al. | |
| 2003/0083925 A1 | 5/2003 | Weaver et al. | |
| 2003/0088458 A1 | 5/2003 | Afeyan et al. | |
| 2003/0097292 A1 | 5/2003 | Chen et al. | |
| 2003/0110072 A1 | 6/2003 | Delurgio et al. | |
| 2003/0110080 A1 | 6/2003 | Tsutani et al. | |
| 2003/0120584 A1 | 6/2003 | Zarefoss et al. | |
| 2003/0126010 A1 | 7/2003 | Barns-Slavin | |
| 2003/0126136 A1 | 7/2003 | Omoigui | |
| 2003/0167098 A1 | 9/2003 | Walser et al. | |
| 2003/0172007 A1 | 9/2003 | Helmolt et al. | |
| 2003/0172145 A1 | 9/2003 | Nguyen | |
| 2003/0208402 A1 | 11/2003 | Bibelnieks et al. | |
| 2003/0208420 A1 | 11/2003 | Kansal | |
| 2003/0220830 A1 | 11/2003 | Myr | |
| 2003/0229502 A1 | 12/2003 | Woo | |
| 2003/0236721 A1 | 12/2003 | Plumer et al. | |
| 2004/0093296 A1 | 5/2004 | Phelan et al. | |
| 2004/0103051 A1 | 5/2004 | Reed et al. | |
| 2004/0111388 A1 | 6/2004 | Boiscuvier et al. | |
| 2004/0111698 A1 | 6/2004 | Soong et al. | |
| 2004/0199781 A1 | 10/2004 | Erickson et al. | |
| 2004/0210489 A1 | 10/2004 | Jackson et al. | |
| 2004/0230475 A1 | 11/2004 | Dogan et al. | |
| 2005/0033761 A1 | 2/2005 | Guttman et al. | |
| 2005/0066277 A1 | 3/2005 | Leah et al. | |
| 2005/0096963 A1 | 5/2005 | Myr et al. | |
| 2005/0197896 A1 | 9/2005 | Viet et al. | |
| 2005/0198121 A1 | 9/2005 | Daniels et al. | |
| 2005/0256726 A1 | 11/2005 | Benson et al. | |
| 2005/0256753 A1 | 11/2005 | Viet et al. | |
| 2005/0262108 A1 | 11/2005 | Gupta | |
| 2005/0267901 A1 | 12/2005 | Irlen | |
| 2005/0288989 A1 | 12/2005 | Kim et al. | |
| 2005/0289000 A1 | 12/2005 | Chiang et al. | |
| 2006/0010067 A1 * | 1/2006 | Notani et al. | 705/39 |
| 2006/0047608 A1 | 3/2006 | Davis et al. | |
| 2006/0069598 A1 | 3/2006 | Schweitzer et al. | |
| 2006/0074728 A1 | 4/2006 | Schweitzer et al. | |
| 2006/0143030 A1 | 6/2006 | Wertheimer | |
| 2006/0235557 A1 | 10/2006 | Knight et al. | |
| 2006/0248010 A1 | 11/2006 | Krishnamoorthy et al. | |
| 2007/0050195 A1 | 3/2007 | Malitski | |
| 2007/0055482 A1 | 3/2007 | Goodermote et al. | |
| 2007/0100981 A1 | 5/2007 | Adamczyk et al. | |
| 2007/0136150 A1 | 6/2007 | Biancavilla et al. | |
| 2007/0174119 A1 | 7/2007 | Ramsey et al. | |
| 2007/0174146 A1 * | 7/2007 | Tamarkin et al. | 705/28 |
| 2007/0208608 A1 | 9/2007 | Amerasinghe et al. | |
| 2007/0223462 A1 | 9/2007 | Hite et al. | |
| 2007/0288296 A1 | 12/2007 | Lewis | |
| 2008/0077459 A1 | 3/2008 | Desai et al. | |
| 2008/0086392 A1 | 4/2008 | Bishop et al. | |
| 2008/0140581 A1 | 6/2008 | Mayer | |
| 2008/0140688 A1 | 6/2008 | Clayton et al. | |
| 2008/0208678 A1 | 8/2008 | Walser et al. | |
| 2008/0208719 A1 | 8/2008 | Sharma et al. | |

(56) References Cited

U.S. PATENT DOCUMENTS

| | | | |
|---|---|---|---|
| 2009/0112675 A1* | 4/2009 | Servais | 705/8 |
| 2009/0271241 A1 | 10/2009 | Pratt | |
| 2010/0114669 A1 | 5/2010 | Birjandi et al. | |
| 2010/0145501 A1 | 6/2010 | Guilbert et al. | |
| 2011/0071877 A1 | 3/2011 | Ettl et al. | |
| 2011/0145030 A1* | 6/2011 | Allen | 705/7.12 |
| 2012/0054076 A1 | 3/2012 | Wu et al. | |
| 2012/0179505 A1 | 7/2012 | McMains | |
| 2012/0179506 A1 | 7/2012 | McMains | |

OTHER PUBLICATIONS

De Villiers, Noelene, "The evolution of the Merchandising Processes at Woolsworths, SA" National Retail Federation, NRF 97$^{th}$ Annual Convention & Expo, Jan. 13-16, 2008.*
"Merchandise and Assortment Planning" Torexretail, Feb. 2007.*
"ProfitLogic Launches ProfitLogic 2003: An Expanded Merchandise Optimization Suite including Assortment, Allocation, Markdown and Promotion Optimization," PR Newswire, New York, Jun. 10, 2003.*
"SAS Size Optimization Fits Retailers Perfectly," NewsRX, Jan. 21, 2008.*
"Advanced Allocation," MID Retail, Jun. 19, 2009, http://web.archive.org/...090620003441/http://www.midretail.com/RetailProductSuite/AdvancedAllocation/tabid/107/Default.aspx.*
Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).
Beamon, "Supply chain design and analysis: models and methods," International Journal of Production Economics (1998).
Cohen et al., "SAS/OR Optimization Procedures, with Applications to the Oil Industry," SAS Institute, SUGI Proceedings (1994).
Cook et al., "Evaluating Suppliers of Complex Systems: A multiple criteria approach," The Journal of the Operational Research Society (Nov. 1992).
De Prisco et al., "On Optimal Binary Search Trees", Information Processing Letters, vol. 45, pp. 249-253 (Apr. 1993).
Hollander, Geoffrey, "Modell deftly parses customer characteristics", InfoWorld, vol. 20, No. 21, pp. 1-4, retrieved from Dialog, file 148 (May 25, 1998).
Horngren, Charles T. et al., "Cost Accounting a Managerial Emphasis", Tenth Edition, Chapter 14, pp. 497-534 (2000).
Johnson et al, Recent Developments and Future Directions in Mathematical Programming, IBM Systems Journal, vol. 31, No. 1, pp. 79-93 (1992).
Keamey, "Advances in Mathematical Programming and Optimization in the SAS System," SAS Institute, SUGI Proceedings (1999).
Kelley, Dave, "Merchandise Intelligence: Predictive insights improve bottom line," RIS News, p. 32 (Mar. 2006).
Lee et al., "An effective supplier development methodology for enhancing supply chain performance," ICMIT (2000).
Lee et al., "Supplier Selection and Management system Considering Relationships in Supply Chain Management," IEEE Transactions on Engineering Management (Aug. 2001).
Manchanda et al, The "Shopping Basket"; A Model for Multi-Category Purchase Incidence Decisions, Marketing Science, vol. 18, pp. 95-114 (Nov. 2, 1999).
Medaglia, Andres, "Simulation Optimization Using Soft Computing," dissertation for Operations Research Department at North Carolina State University (Jan. 24, 2001).
Na, H.S. et al., "Data Scaling for Operational Risk Modelling", ERIM Report Series Research in Management, 24 pp. (Dec. 2005).
Pedersen et al., "Multidimensional Database Technology", IEEE, Computer, vol. 34, Issue 12, pp. 40-46 (Dec. 2001).
Peemoller, Fred A., "Operational Risk Data Pooling", Frankfurt/Main, Deutsche Bank AG, 38 pp. (Feb. 7, 2002).
Pisinger, David, "A Minimal Algorithm for the Multiple-Choise Knapsack Problem", Technical Report 94/25, DIKU, University of Copenhagen, Denmark, pp. 1-23 (May 1984).

Porter-Kuchay, Multidimensional Marketing, Target Marketing (Jan. 2000).
Ramirez, Ariel Ortiz, "three-Tier Architecture," Linux Journal, downloaded from http://www.linuxjournal.com/article/3508, 4 pp. (Jul. 1, 2000).
Renaud, Jacques et al., "A heuristic for the pickup and delivery traveling salesman problem," Computers & Operations Research, 27, pp. 905-916 (2000).
Rosen, Michele, "There's Gold in That There Data", Insurance & Technology, vol. 23, No. 12, pp. 1-6, , retrieved from Dialog, file 16 (Dec. 1998).
Saarenvirta, Data Mining to Improve Profitability, CMA Magazine, vol. 72, No. 2, pp. 8-12 (Mar. 1998).
Samudhram, Ananda, "Solver setting for optimal solutions," New Straits Times (Nov. 22, 1999).
Schindler et al., "Increased Consumer Sales Response Through Use of 99-ending Prices" Journal of Retailing, vol. 72, pp. 187-199 (1996).
Smith, Michael John Sebastian, "Application-Specific Integrated Circuits," Addison-Wesley Longman, Inc., Chapter I: Introduction to ASICS, cover page and pp. 20-34.
Spiegelman, "Optimizers Assist in Specialized marketing Efforts," Computer Reseller News (Nov. 22, 1999).
Business Wire, "Perfect and Open Ratings Form Alliance to Provide Critical Supplier Performance Ratings to Private Exchanges and Net Markets" (Oct. 30, 2000).
Business Wire, "SAS and Kohl's Partner on Merchandise Intelligence Suite," downloaded from http://findarticles.com/p/articles/mi_m0EIN/is_2005_Jan_17/ai_n8695858/, 2 pp. (Jan. 17, 2005).
Cognizant Technology Solutions, "Pre Pack Optimization: Increasing Supply Chain Efficiency", pp. 1-26 (undated).
Data Mining News, Looking Past Automation, MarketSwitch Focuses on Optimization of Marketing Campaigns, Data Mining News (May 10, 1999).
"i2 Technologies: i2 releases i2 five.two—the complete platform for dynamic value chain management; flexible, intuitive, powerful solutions designed to help companies gain efficiencies and drive revenue", M2 Presswire (Oct. 25, 2001).
Microsoft, MSDN, Chapter 5: Layered Application Guidelines, downloaded from http://msdn.microsoft.com/en-us/library/ee658109(d=printer).aspx (10 pp.).
Microsoft, MSDN, Three-Layered Services Application, downloaded from http://msdn.microsoft.com/en-us/library/ff648105(d=printer).aspx (6 pp.).
Modell by Group 1 Software, www.g1.com, retrieved from Google.com and archive.org., pp. 1-16 (Aug. 29, 1999).
Multitier Architecture definition from Wikipedia (4 pp.).
SAS Institute, Inc., www.sas.com, retrieved from Google.com and archive.org, pp. 1-28 (Jan. 29, 1998).
Bertsimas et al., "Introduction to Linear Optimization" Athena Scientific, Belmont, Massachusetts, 1997, pp. 505-506, 530.
Chettri, Inderlal Singh et al., "Pre Pack Optimization: Increasing Supply Chain Efficiency", Cognizant Technology Solutions, pp. 1-26 (undated).
i2 Technologies, Inc., "Improving Service and Market Share with i2 Inventory Optimization: How superior inventory management can be deployed as a competitive weapon to drive the top and the bottom line", pp. 1-26 (Aug. 2004).
Haupt, J, "Enterprise Wide Data Warehousing with SAP BW," SAP AG, pp. 1-38 (2004).
Howard, Philip, "Data Warehousing with SAS," Bloor Research, pp. 1-13 (2005).
McDonald, Kevin et al., "Mastering the SAP® Business Information Warehouse," Wiley Publishing, Inc., pp. 1-18, 35-88, and 279-332 (Sep. 2002).
White, John W., "Making ERP Work the Way Your Business Works," Fuego, ERP White Paper, pp. 1-8 (2002).
Data Model definition from Wikipedia (18 pp.).
Enterprise Application Integration definition from Wikipedia (7 pp.).
Enterprise Information Integration definition from Wikipedia (3 pp.).
Service-Oriented Architecture definition from Wikipedia (19 pp.).
Software as a Service definition from Wikipedia (7 pp.).

(56) References Cited

OTHER PUBLICATIONS

Bolat, Ahmet et al., "A Surrogate Objective for Utility Work in Paced Assembly Lines," Technical Report 91-32, pp. 1-17 (Oct. 1991).
Hababou, Moez et al., "Variable Selection in the Credit Card Industry," NESUG 2006 Analysispp. 1-5 (2006).
Scheiber, Thomas et al., "Surrogate time series," Physica D 142, pp. 346-382 (2000).
Siddiqi, Naeem, "Credit Risk Scorecards—Developing and Implementing Intelligent Credit Scoring," John Wiley & Sons, Inc., pp. 1-196 (2006).
Wang, Pu, "Pack Optimization Problem: Models and Solution Methods," Dissertation, North Carolina State University, Raleigh, NC, Nov. 2010.
Final Office Action of Jul. 18, 2013 for U.S. Appl. No. 12/987,489, 27 pages.
Notice of Allowance of Apr. 17, 2013 for U.S. Appl. No. 12/871,487, 20 pages.
Bales, Egon et al., "Octane: A New Heuristic for Pure 0-1 Programs," Operations Research, 2001 Informs, vol. 49, No. 2, pp. 207-225 (Mar.-Apr. 2001).
Arnold, Jens et al., "Evolutionary Optimization of a Multi-location Inventory Model with Lateral Transshipments," Faculty of Informatics, Technical University of Chemnitz-Zwickau, 09107 Chemnitz, Germany, 11 pp. (1996).
Lee, Calvin B. Ph.D., "Multi-Echelon Inventory Optimization," Evant White Paper Series, pp. 1-13 (2003).
Mangal, Dharamvir et al., "Inventory Control in Supply Chain Through Lateral Transshipment—A Case Study in Indian Industry," International Journal of Engineering (JJE), vol. 3, Issue 5, pp. 443-457 (Jan. 2009).
Paterson, Colin et al., "Inventory Models with Lateral Transshipments: A Review," 19 pp. (Aug. 26, 2009).
Yang, Guangyuan et al., "Service Parts Inventory Control with Lateral Transshipment that takes Time," Tinbergen Institute Discussion Paper, TI 2010-025/4 (2010).
Aberdeen Group Research Brief, "IBM Puts a Pragmatic Face on Advanced Inventory Optimization," pp. 1-6 (Apr. 11, 2006).
Manhattan Associates, "Multi-Echelon Inventory Optimization," pp. 1-9 (2009).
SAS Institute Inc., "Service Parts Optimization: Inventory vs. availability," pp. 1-13 (2006).
Non-Final Office Action of May 10, 2011 for U.S. Appl. No. 12/111,312, 25 pages.
Final Office Action of Dec. 14, 2011 for U.S. Appl. No. 12/111,312, 25 pages.
Non-Final Office Action of Mar. 13, 2012 for U.S. Appl. No. 12/871,487, 25 pages.
Non-Final Office Action of Aug. 14, 2012 for U.S. Appl. 12/987,486, 27 pages.
Non-Final Office Action of Sep. 25, 2012 for U.S. Appl. No. 12/987,489, 29 pages.
Kurz Sascha, Rambau Jorg, Schluchtermann Jorg, and Wolf Rainer, 2008, The Top-Dog Index, pp. 1-23.
Elmaghraby Salah and Bawle Vishwas, 1972, Optimization of Batch Ordering under Deterministic Variable Demand, pp. 508-517.
Hsiao Yu-Cheng, 2008, Optimal single-cycle policies for the one-warehouse multi-retailer inventory/distribution system, pp. 219-229.
Gaul Constantin, Kurz Sacha, and Rambau Jorg, 2008, Lotsize Optimization Leading to a Median problem with cardinalities.
Final Office Action of Sep. 12, 2013 for U.S. Appl. No. 12/987,486, 20 pages.
Armstrong, Mark, "Multiproduct Nonlinear Pricing", Econometrica, vol. 64, No. 1, pp. 51-75 (Jan. 1996).
Armstrong, Ronald D. et al., The Multiple-Choice Nested Knapsack Model', Management Science, vol. 28, No. 1, pp. 34-43 (Jan. 1982).
Balintfy et al, Binary and Chain Comparisons with an Experimental Linear Programming Food Price Index, The Review of Economics and Statistics, vol. 52, No. 3, pp. 324-330 (Aug. 1970).
Millin, Vincent, Jun. 22, 2004 International Search Report from PCT/US03/13394 (1 pg.).
Non-Final Office Action of Nov. 8, 2013 for U.S. Appl. No. 12/111,312, 25 pages.

\* cited by examiner

SYSTEMS AND METHODS FOR DETERMINING PACK ALLOCATIONS

TECHNICAL FIELD

The present disclosure relates generally computer-implemented product analysis systems and more particularly to computer-implemented systems for determining pack allocations for distribution.

BACKGROUND

Retailers confront many issues when deciding what products to provide to stores. The issues can become even more daunting when the decision process additionally has to consider which types of a specific product a distributor should supply. For example, clothing products come in several different sizes. Determining what sizes in addition to what specific clothes to provide becomes problematic especially given the vast array of clothing options available to a retailer.

Retailers typically solve the problem of how much and what sizes of a product to provide among their various stores by looking at the product allocation decisions of the previous year, and then, they will make slight adjustments based on relatively simple analytics and/or intuition given the previous year's sales and performance. Retailers may also try to address this problem by analyzing revenue goals that have been set at a company level. They then decide how to best reach these goals—that is, they typically determine, among other things, how much of each product they should order (and sell) to meet these goals. Such approaches can lead to product assortments that are not aligned with consumer demands.

SUMMARY

In accordance with the teachings provided herein, systems and methods are provided for a computer-implemented method for determining a plurality of pack configurations to make available for distribution to a plurality of stores, where a pack configuration contains a particular number of units of each of a plurality of variations of a product. The systems and methods may include receiving an allowable pack size constraint, where a pack size is a sum of each of the plurality of variations in a pack, and receiving a maximum pack configuration constraint, where the maximum pack configuration constraint identifies the maximum pack configurations allowed in the plurality of pack configurations. Mismatch cost data may be received, where mismatch overdelivery costs are attributed to a store for each unit of a variation of the product delivered to the store above a demand level and mismatch underdelivery costs are attributed to the store for each unit of the variation of the product delivered to the store below the demand level. Product demand data for the plurality of stores may also be received, where the product demand data for the store identifies a demand for each of the variations of the product at the store. A first pack for the store may be determined, where the first pack contains a particular number of different variations of the product, and where the first pack meets the allowable pack size constraint and minimizes mismatch costs for the store. A second pack for the store may be determined based on the demand data for the store and the first pack for the store, where a store pack configuration set comprises the first pack and the second pack. The stores may be clustered based on similarity of store pack configuration sets, wherein each cluster includes a single cluster pack configuration set. A total pack configuration amount as a total of all packs in the cluster pack configuration sets may be determined, and store clusters may be combined based on similarity of cluster pack configuration sets until the total pack configuration amount meets the maximum pack configuration constraint.

As another example, a computer-implemented method for determining a quantity of each of a plurality of inner pack configurations to purchase for a plurality of stores is provided, where the plurality of stores are associated with a distribution center, where an inner pack configuration contains a particular number of units of different variations of a product, and where an outer pack contains a particular number of inner packs. An identification of available inner pack configurations may be received along with a particular number of each inner pack configuration contained in an outer pack. Mismatch cost data may be received, where mismatch overdelivery costs are attributed to a store for each unit of a variation of the product delivered to the store above a demand level and mismatch underdelivery costs are attributed to the store for each unit of the variation of the product delivered to the store below the demand level. Product demand data for the plurality of stores may be received, where the product demand data for the store identifies a demand profile detailing demand for each of the variations of the product at the store. A first inner pack configuration may be identified from the available inner pack configurations for a store, where the first inner pack configuration best matches the demand profile for the store. A quantity of the first inner pack configuration may be added to a purchase order for the store until a mismatch cost associated with the store increases. A determination may be made as to whether adding a second inner pack configuration to the purchase order would reduce the mismatch cost for the store. When adding the second inner pack configuration would reduce the mismatch cost, a quantity of the second inner pack configuration may be added to the purchase order for the store until the mismatch cost associated with the store increases. Quantities of the first inner pack configuration across purchase orders of the stores associated with the distribution center may be summed to generate a first total to be included in the purchase order. A determination may be made as to which of adding or subtracting inner pack configurations to the purchase order would affect total mismatch costs least, and inner pack configurations may be added or subtracted to the purchase order so that an adjusted first total is a multiple of the particular number of inner packs that the outer pack contains, where adding or subtracting is based on the determining which of adding or subtracting would affect the total mismatch cost least.

As a further example, a computer-implemented method for determining a distribution of each of a plurality of inner packs to a plurality of stores is provided, where an inner pack contains a particular number of units of each of a plurality of variations of a product, and where an outer pack contains a particular number of inner packs. Mismatch cost data may be received, where mismatch overdelivery costs are attributed to a store for each unit of a variation of the product delivered to the store above a demand level and mismatch underdelivery costs are attributed to the store for each unit of the variation of the product delivered to the store below the demand level. Product demand data may be received for the plurality of stores, where the product demand data for the store identifies a demand profile detailing demand for each of the variations of the product at the store. A first inner pack quantity for distribution may be determined based on the product demand data. A supply difference amount may be determined, where the supply difference amount is a difference between the first inner pack quantity and the number of first inner packs available for distribution. A determination may be made that adjusting the first inner pack quantity for the particular store based on the supply difference amount would have less effect on mismatch costs than other stores, and the first inner pack quantity may be adjusted for the particular store based on the supply difference.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
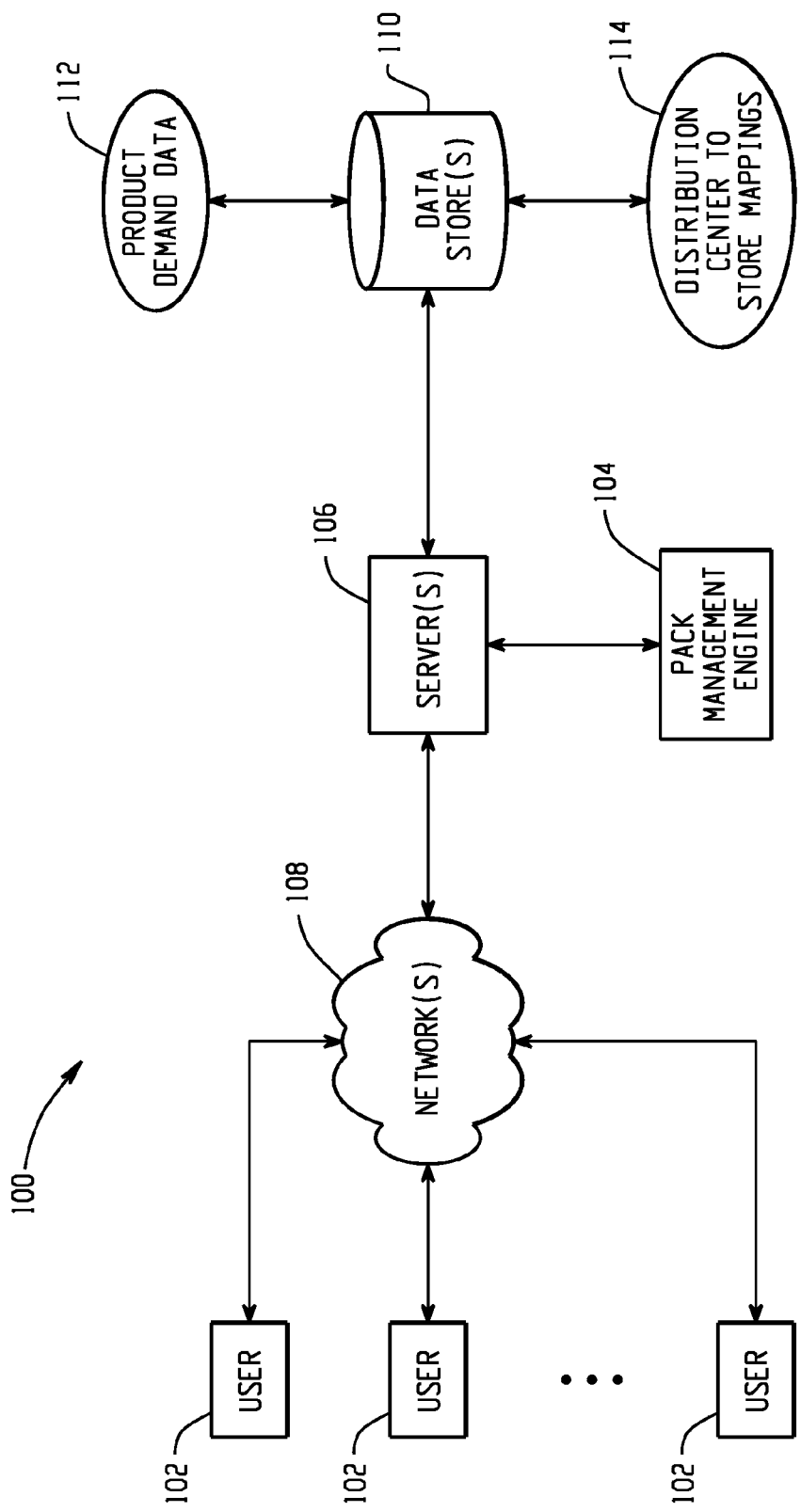
FIG. 1 depicts a computer-implemented environment for performing pack management for a plurality of stores.

FIG. 1 depicts a computer-implemented environment for performing pack management for a plurality of stores. A user 102 interacts with a pack management engine 104 on one or more servers 106 accessible via one or more networks 108.

The user may interact with the pack management engine to perform a number of operations related to distribution of different varieties of products to retailers. For example, a clothing company may have a number of associated retail locations to which to distribute products. In addition to a variety of styles, clothing also comes in a variety of sizes, such as small, medium, large, extra-large, etc. Merchandise is shipped from a vendor to a fashion retailer in a limited set of fixed pack configurations. For example, a shirt that sells in sizes small, medium, and large might be available in packs of: 2 smalls, 3 mediums, and 1 large; and 1 small, 3 mediums, and 1 large. Sometimes these pack configurations are determined by the vendor. However, some retailers may be able to dictate the configurations they would like to the vendor. The pack management engine 104 may be utilized to determine optimum or near optimum pack configurations for a retailer.

The pack management engine 104 may also be utilized in making product ordering decisions. Having knowledge of the pack configurations available and the demand for different varieties (e.g., sizes) of a product, the pack management engine 104 can provide recommendations for the number of each pack configuration to order for all of the stores or a group of the stores. For example, retailers may forecast the demand for a style or style-color of a product that they intend to sell. A store level size level demand forecast may be generated at each store. For example, the company-wide demand for the product may be distributed across all of the stores for the retailer, and a size profile may be applied to the demand at each store. Store level demand may be determined by other means as well, including forecasting size level demand for each store individually. Given the limited pack configurations available, it is often not possible to meet the forecasted store demand exactly. Thus, some variations of a product may be under-stocked and some may be over-stocked. The pack management engine 104 may be utilized to determine how many of each pack configuration should be ordered from a vendor in order to supply product to best meet forecasted store demand.

The pack management engine 104 may also be utilized in making product distribution decisions. Product ordered from a vendor is often delivered to distribution centers, where each distribution center is associated with a plurality of stores. Numbers of different pack configurations are ordered from the vendor and shipped to each distribution center based on the forecasted demand for the stores associated with each distribution center. Upon receipt of the packs, a decision may be made as to how many of each pack should be distributed to each store. These numbers may differ from the numbers used in deciding how many of each pack configuration to order from the vendor. The variation may be caused by a number of factors including updated demand forecasts and a difference in the number of packs delivered to the distribution center by the vendor from the number ordered. The pack management engine may analyze the product delivered to the distribution center and determine a distribution plan for the product to stores that minimizes aggregate mismatch costs across all stores.

The users 102 can interact with the pack management engine 104 in a number of ways, such as over one or more networks 108. For example, server(s) 106 accessible through the network(s) 108 can host the pack management engine 104. One or more data stores 110 can store data used by the pack management engine 104 as well as any intermediate or final data generated by the pack management engine 104. The one or more data stores 110 may contain many different types of data associated with the process including product demand data 112, distribution center to store mappings 114, as well as other data. The pack management engine 104 can be an integrated web-based reporting and analysis tool that provides users flexibility and functionality for performing pack management operations. It should be understood that the pack management engine 104 could also be provided on a standalone computer. It should also be understood that the pack management engine 104 may be utilized with hardware implementations of software such as field programmable gate arrays.

Figure 2:
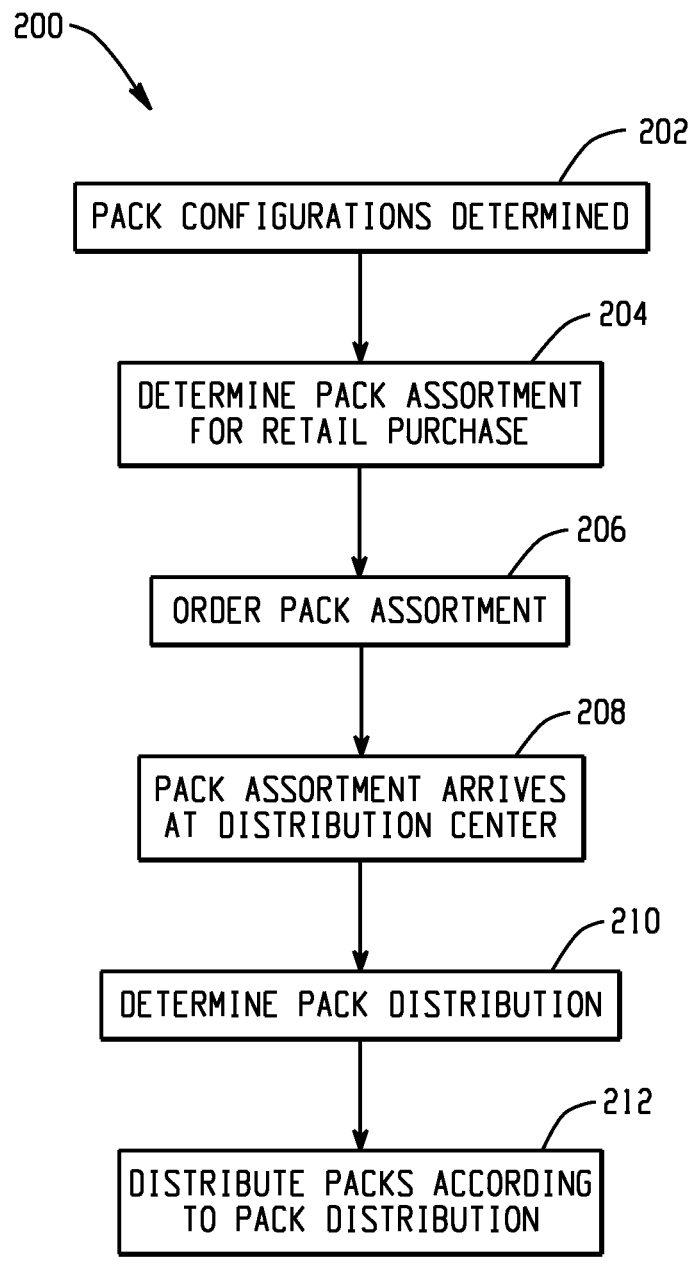
FIG. 2 is a flow diagram depicting an example process flow that utilizes a pack management engine.

FIG. 2 is a flow diagram depicting an example process flow that utilizes a pack management engine. The pack management engine determines optimum or near-optimum pack configurations for a plurality of stores at 202. For example, a set of 3 pack configurations may be selected for ordering for the plurality of stores. At 204, the pack management engine may be used to determine how many of each pack configuration should be ordered for purchase from the vendor. For example, demand for all stores may be used to determine how many of each pack configuration should be ordered. For some operations, purchase decisions may be made at a distribution center level, where a number of each pack configuration is determined for each distribution center based on the demand at stores associated with that distribution center. At 206, the pack configurations are ordered, and at 208 the packs are delivered to the distribution center. Packs may be organized into inner and outer packs. An inner pack may contain particular numbers of varieties of a product, and an outer pack may contain a particular number of (the same) inner pack configurations. Products may be ordered from a vendor at an outer pack level. In some cases, an outer pack may be the smallest shippable unit. However, in other cases, the outer pack contains a particular number of inner packs which may be shipped individually if the outer pack is opened at the Distribution Center. The total number of inner packs ordered for each Distribution Center may be some multiple of the number of inner packs in the outer pack.

At 210, the pack management engine may be used to determine how to distribute pack configurations to individual stores. The assignment of pack configurations for distribution at 210 to stores may differ from the determined number of pack configurations to order for a store at 204 for a variety of reasons such as changes in forecasted demand or differences between amounts ordered at 206 and delivered at 208. At 212, pack configurations are distributed to stores according to the determination at 210.

Figure 3:
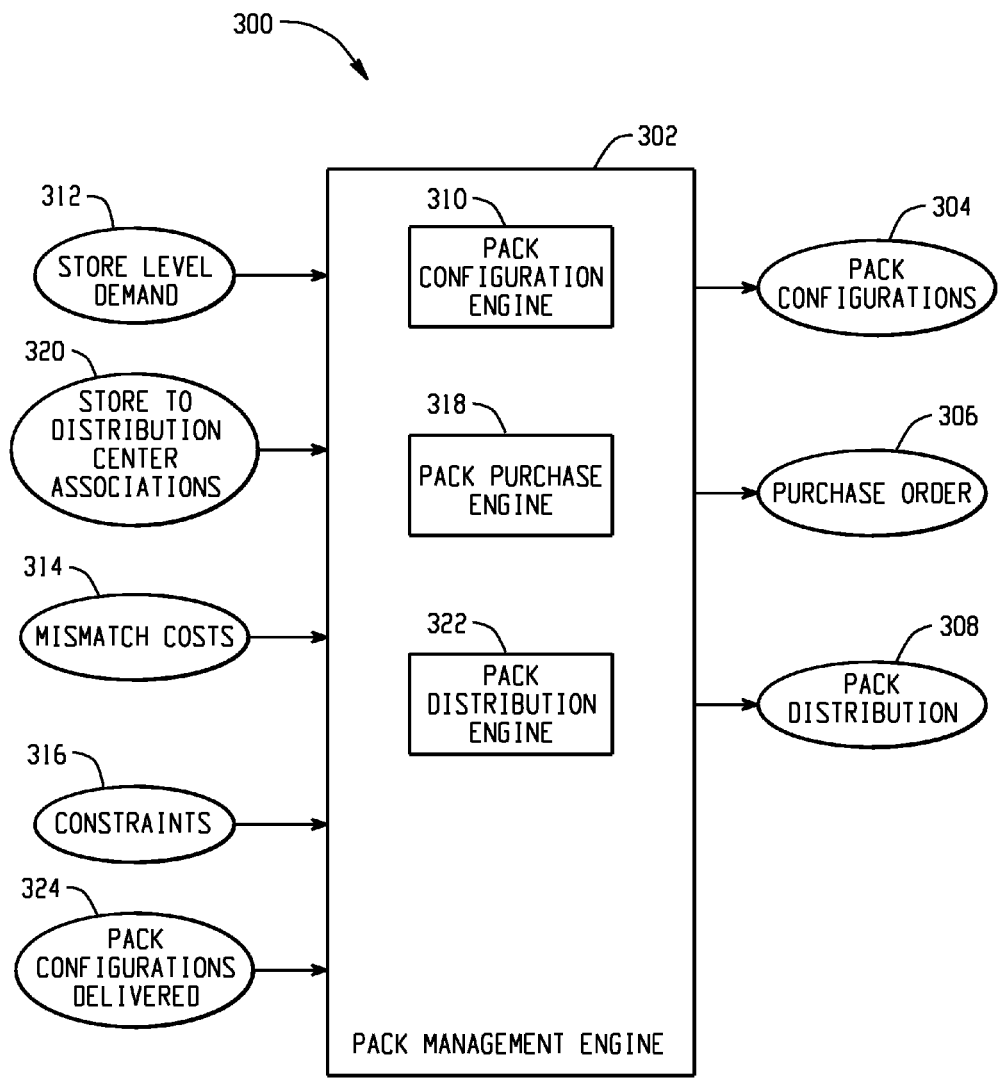
FIG. 3 is a block diagram depicting example inputs and outputs to a pack management engine.

FIG. 3 is a block diagram depicting example inputs and outputs to a pack management engine. The pack management engine 302 may receive a variety of data for generating pack configurations 304, purchase orders 306 for pack configurations from vendors, and pack distribution plans 308 for distributing received pack configurations, as described above. A pack configuration engine 310 may generate optimum or near-optimum pack configurations 304 based on store level demand forecasts 312, mismatch costs 314 for over-stocked and under-stocked items, and received constraints 316. Example constraints may include the number of items of a product that can be present in a pack configuration and a total number of pack configurations that are permitted.

A pack purchase engine 318 may determine a number of each pack configuration to order for a distribution center based on the stores associated with the distribution center. Such associations 320 may be received by the pack purchase engine 318, and purchase orders 306 may be determined based on the store level demand 312 of associated stores, mismatch costs 314, and constraints 316. Example constraints 316 may include minimum and maximum numbers of each product that can be held at a store or minimum or maximum numbers of products that must be ordered from the vendor (e.g. to meet a budget constraint).

A pack distribution engine 322 may determine a number of each pack configuration to distribute to stores associated with a distribution center. The pack distribution engine may consider store level demand 312 for associated stores, mismatch costs 314, constraints 316, as well as a number of each pack configuration 324 delivered to a distribution center.

Figure 4:
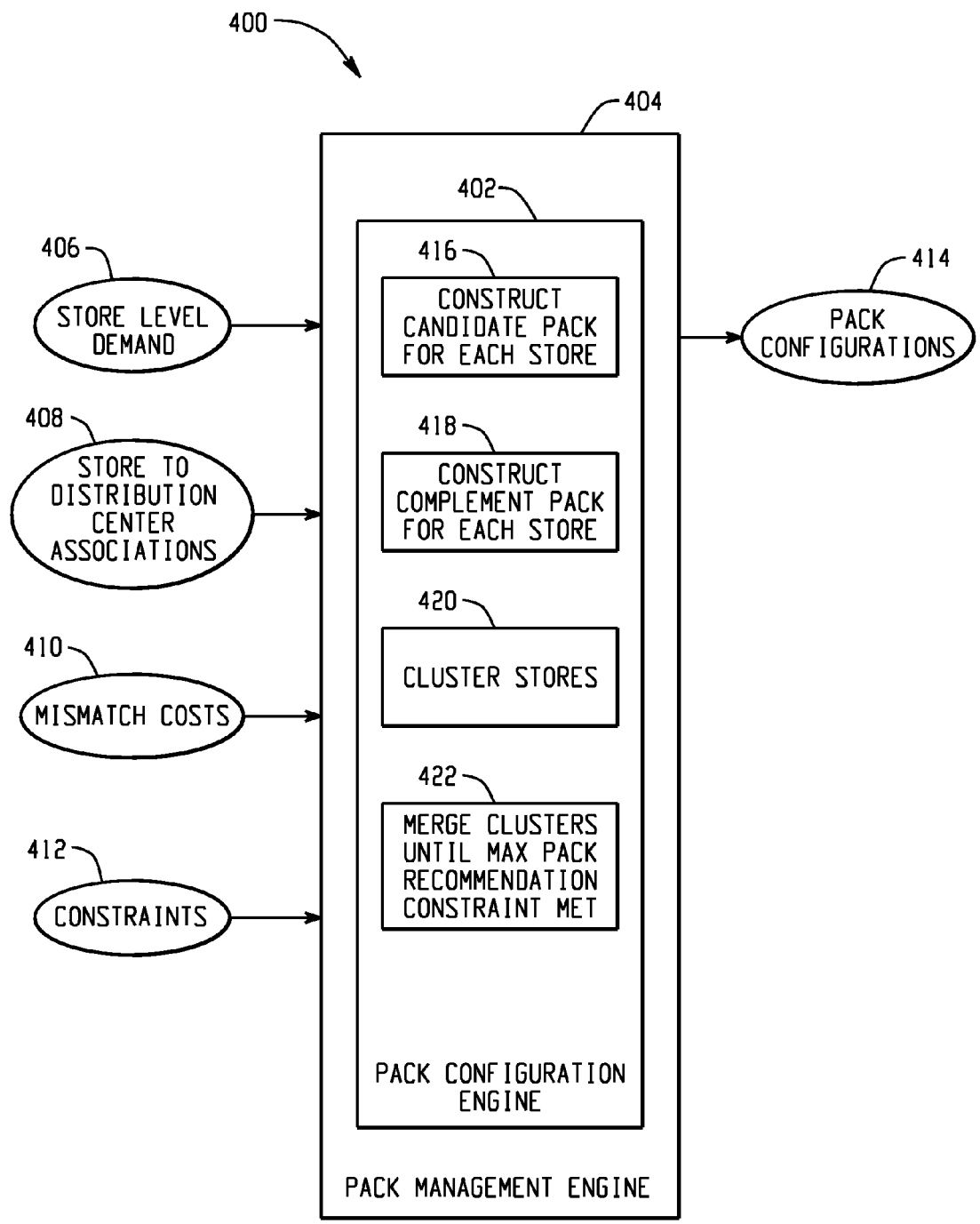
FIG. 4 is a block diagram depicting example operations performed by a pack configuration engine in generating pack configurations.

FIG. 4 is a block diagram depicting example operations performed by a pack configuration engine in generating pack configurations. A pack configuration engine 402 of the pack management engine 404 may receive store level demand values 406, store to distribution center associations 408, mismatch costs 410, and constraints 412. To generate a set of pack configurations 414, the pack configuration engine may construct a first candidate pack 416 for each store. The candidate pack configuration contains a particular number of different variations of the product that are selected based on the demand level for that store. For example, if a store has a forecasted demand of 20% small, 50% medium, and 30% large and the allowable pack size is 4 items, then a first candidate pack may be selected as 1 small, 2 medium, and 1 large. The pack configuration engine 402 may then select a second pack for the store at 418 as a complementary pack to the first candidate pack. The second, complementary pack may be selected based on the first pack to supplement the first pack in meeting the store's demand. For example, a second pack for the above example could contain 4 large variations of the product based on the first candidate pack containing 25% large items with forecasted demand for large items being 30%.

At 420, stores are clustered to reduce the number of pack configurations under consideration. Clustered stores have a common cluster pack configuration set. Stores having similar characteristics—including demand profiles and Distribution Centers—are selected to have their clusters combined. When clusters are combined, the set of pack configurations is reduced in the combined cluster. Subsequent clustering may combine stores by determining cluster pack configuration sets that result in low mismatch costs for the stores within that cluster. As shown at 422, clusters and stores may continue to be merged until a maximum pack configuration constraint is met. Such a constraint may dictate that a total of 4 pack combinations may be permitted. Thus, clusters may be combined until the number of unique pack configurations across all clusters is equal to or less than 4.

Figure 5:
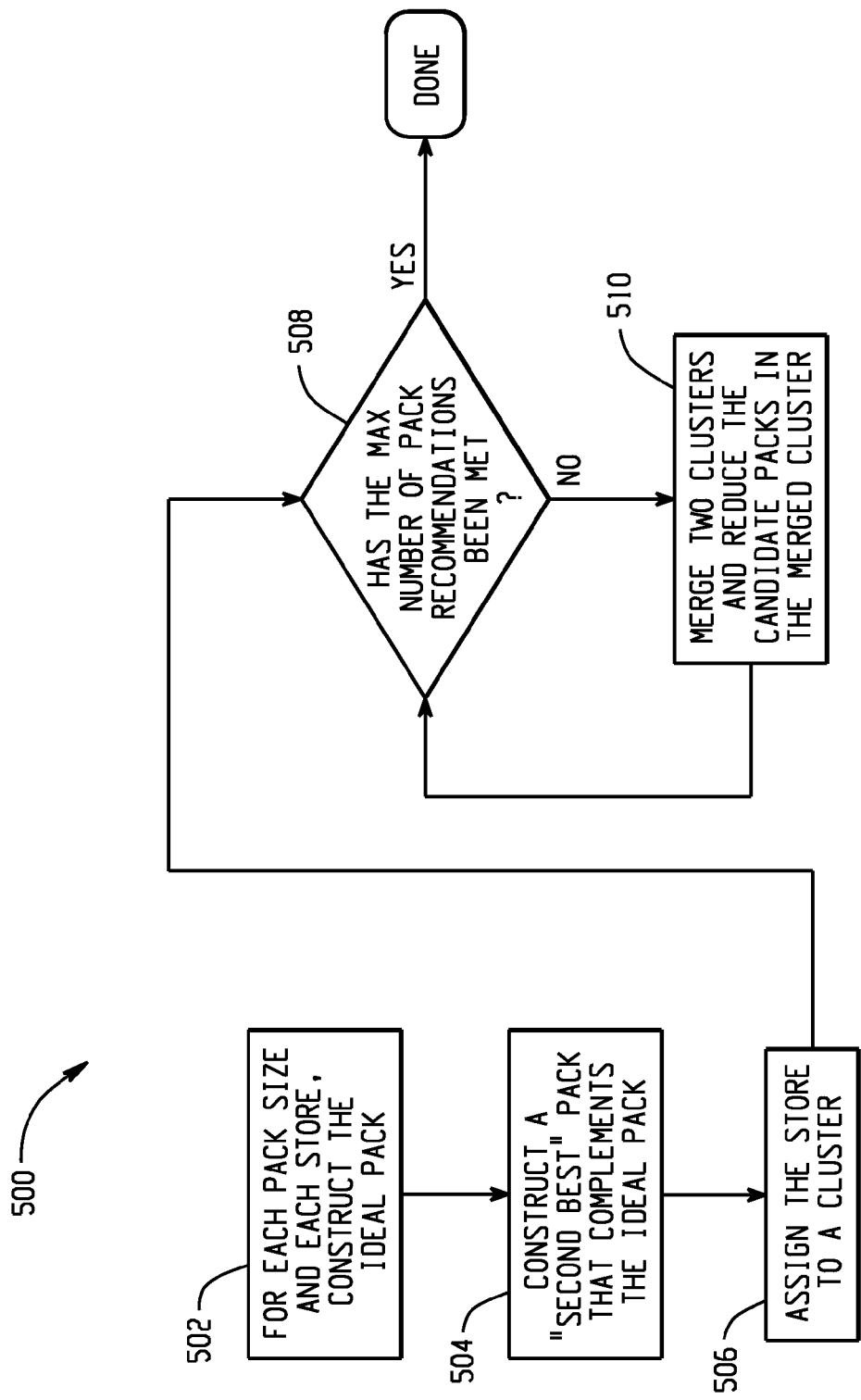
FIG. 5 is a flow diagram depicting a process for determining pack configurations.

FIG. 5 is a flow diagram depicting a process for determining pack configurations. Size level demand forecasts at a store level, store to distribution center associations, over and under penalty costs for each size at each store (mismatch costs) may be received. An example set of mismatch costs may increase along a step-wise function such that the cost of over or under satisfying the forecasted store demand increases the more mismatches are generated. Mismatch costs may be determined in a variety of ways such as equating a mismatch cost with the cost of marking down an item that does not sell or the margin on an item that would have sold had it been in stock. Required pack configurations may be received along with constraints. Example constraints may include a minimum and maximum number of each variation of a product that must be ordered for each store, a minimum and maximum number of each variation of a product that must be ordered across all stores (or all stores associated with a distribution center), allowable inner pack sizes, the maximum number of units that may be in any pack configuration, and the maximum number of pack configurations allowed to be recommended. The process may additionally track handling costs associated with operations, such as sending less than a full outer pack to a store to better meet that store's demand. Handling costs may include labor and loss costs for opening outer packs to access inner packs and differences in shipping costs between outer packs and multiple inner packs. Mismatch costs typically are larger than handling costs and have a greater effect on pack management operations, such as determining pack configurations, pack ordering, and pack distribution. However, handling costs may at times influence such decision making.

At 502, an ideal pack is constructed for each allowable inner pack size at each store. The retailer, in conjunction with the vendor, may determine the allowable inner pack sizes (e.g., 6 units, 12 units). An ideal, first candidate pack may be constructed by determining the variations of the product to include in the pack. This selection may not include all variations and may be necessary if there are several varieties of the product for a store (e.g., shoe sizes). For the selected variations of the product, a determination may be made as to the percentages of each variation desired for the store based on the forecasted demand at the store. The percentages are multiplied by the pack size, and the ceiling and floor of each of those multiplied values may be considered. The floor or ceiling may be rounded based on the mismatch cost that would be generated for that variation when using that pack. The rounding may be done in decreasing order for the forecasted demand for a variation. That is, variations with a higher demand forecasts are rounded first to minimize mismatch cost for the most important variations. When finished rounding, if the total number of units in the candidate pack does not meet a required pack size constraint, then certain rounding decisions are reversed until the pack size constraint is met.

For example, consider a pack size requirement with a unit count of 6 and a $1 cost for over or under-supplying any size. The forecasted demand for each size is given and totals 50 units. With a forecasted demand for a store of 50 units and a pack of 6 units, either 8 or 9 of the 6-unit pack would be needed to fill the demand. The pack configuration engine considers ordering 8 of the 6-unit pack.

up to the ceiling of 3 units to achieve a mismatch of $4 rather than $5. For larges, the pack configuration engine prefers to round larges down to the floor of 1 unit. For smalls, the pack configuration engine prefers to round up to 2 units. This results in a pack with 2 small, 3 medium and 1 large and a total mismatch cost of $10.

The first pack results in a total mismatch cost of $12, and the second pack results in a mismatch cost of $10, so the pack configuration engine prefers the second pack. Thus, the pack configuration identifies the "ideal" pack for this store as the pack configuration of 2 small, 3 medium and 1 large.

The process of selecting a first candidate pack may be repeated for various subsets of sizes and for each allowable pack unit count. Constraints may be applied or incorporated into the decision making process. For example, pack configurations that do not include all sizes may be penalized by considering the mismatch cost of not furnishing any units of the missing size (e.g., the penalty may be doubled if there is an order quantity constraint on the size and weighted by the percentage of missing sizes divided by the total number of pack recommendations allowed). In this manner, the pack configuration engine may construct a first candidate pack for each store for each allowable pack unit count.

TABLE 1

Store Level Demand and Mismatch Calculation with 8 First Packs Purchased

| Size | Units Desired | Percentage Desired | Multiplied by Unit Count | Floor of Unit Count | Ceiling of Unit Count | Mismatch cost when 8 packs ordered (floor) | Mismatch cost when 8 packs ordered (ceiling) |
|---|---|---|---|---|---|---|---|
| Small | 15 | 0.3 | 1.8 | 1 | 2 | $7 | $1 |
| Medium | 23 | 0.46 | 2.76 | 2 | 3 | $7 | $1 |
| Large | 12 | 0.24 | 1.44 | 1 | 2 | $4 | $4 |

Because medium is the size with the largest forecasted demand, the pack configuration engine tries to minimize mismatch for the medium variation first and will prefer to round up to the ceiling of 3 units to achieve a mismatch cost of $1 rather than $7. The pack configuration engine is indifferent to rounding larges up or down, as the mismatch cost is $4 in either case. If the pack configuration engine decides to round up, then the total number of variations in the candidate pack thus far is 5 (3 mediums and 2 larges). For smalls, the pack configuration engine prefers to round up as well but this would result in a pack size of 7 units so the pack configuration engine may reverse the rounding decision and round down. This results in a pack having 1 small, 3 medium and 2 large and a total mismatch cost of $12.

The pack configuration engine also considers ordering 9 of the 6-unit pack.

At 504, for each "ideal" first candidate pack, a second-best complementary pack is constructed. This second pack is a pack that complements the ideal pack and provides diversity in the set of candidate packs. The second pack may be constructed in a similar fashion as the ideal pack with the store's desired size quantities adjusted to reflect some assumed quantity of the ideal pack. The second pack may be selected as the pack configuration that has the smallest mismatch cost given some assumed quantity of the ideal first pack.

The determined first candidate pack configuration contained 2 small, 3 medium and 1 large. To select a second, complementary pack, the quantity of the first pack that can be ordered without exceeding the forecasted demand for any variation is determined. In the present example, 7 first packs

TABLE 2

Store Level Demand and Mismatch Calculation with 9 First Packs Purchased

| Size | Units Desired | Percentage Desired | Multiplied by Unit Count | Floor | Ceiling | Mismatch cost when 9 packs ordered (floor) | Mismatch cost when 9 packs ordered (ceiling) |
|---|---|---|---|---|---|---|---|
| Small | 15 | 0.3 | 1.8 | 1 | 2 | $6 | $3 |
| Medium | 23 | 0.46 | 2.76 | 2 | 3 | $5 | $4 |
| Large | 12 | 0.24 | 1.44 | 1 | 2 | $3 | $6 |

Because medium is the size with the largest forecasted demand, the pack configuration engine tries to minimize mismatch for the medium variation first and will prefer to round can be ordered before the forecasted demand for mediums (23) is exceeded. The remaining demand for the store after purchase of 7 first packs is as follows.

TABLE 3

Store Level Demand and Mismatch Calculation for Complementary Pack Selection

| Size | Units Desired | Percentage Desired | Multiplied by Unit Count | Floor | Ceiling | Mismatch cost when 1 pack ordered (floor) | Mismatch cost when 1 packs ordered (ceiling) |
|---|---|---|---|---|---|---|---|
| Small | 1 | 0.125 | 0.75 | 1 | 2 | $0 | $1 |
| Medium | 2 | 0.25 | 1.5 | 1 | 2 | $1 | $0 |
| Large | 5 | 0.625 | 3.75 | 3 | 4 | $2 | $1 |

Here, the adjusted needs reflect the fact that the ideal, first candidate pack does not have enough larges compared to the other sizes. The pack configuration engine selects a second, complementary pack that contains 1 small, 1 medium and 4 larges. This complementary, second pack enables near matching of the store level forecasted demand while meeting the pack size constraint of 6 units per pack.

Additional candidate packs may be constructed that include only one size. These "bulk" packs are often used by retailers to better meet the specific quantities of each size at each store, and they may be considered as candidates.

At 506, each store is assigned to a cluster. At this point, each store has a set of candidate packs (e.g., first ideal candidate packs, second complementary packs, bulk packs) that form a store pack configuration set. Stores with identical store pack configuration sets are assigned to the same cluster. To reduce the total number of candidate packs to the relatively small number of packs that the maximum pack configuration constraint allows, clusters may be combined and their packs reduced to form cluster pack configuration sets.

The method of clustering stores to reduce packs may take advantage of the fact that there are generally a small, discrete number of distinct size demand distributions. A retailer may use a size profile to forecast the size level demand at each store, but this profile, if not at the corporate level, is typically at a much higher level than store. Therefore, many stores have the same percentage demand for each size, and many stores will prefer similar packs. The pack configuration engine attempts to combine stores that are the most similar. The merged cluster will often have a diverse set of candidate packs to choose from, and only the best packs will be kept.

At 508, 510, clusters are merged to select a number of pack configurations that meet the maximum pack configuration constraint. At 508, a determination of whether the maximum pack configuration constraint has been met is made, and if not, at 510, two clusters are merged, and the determination at 508 is repeated.

Figure 6:
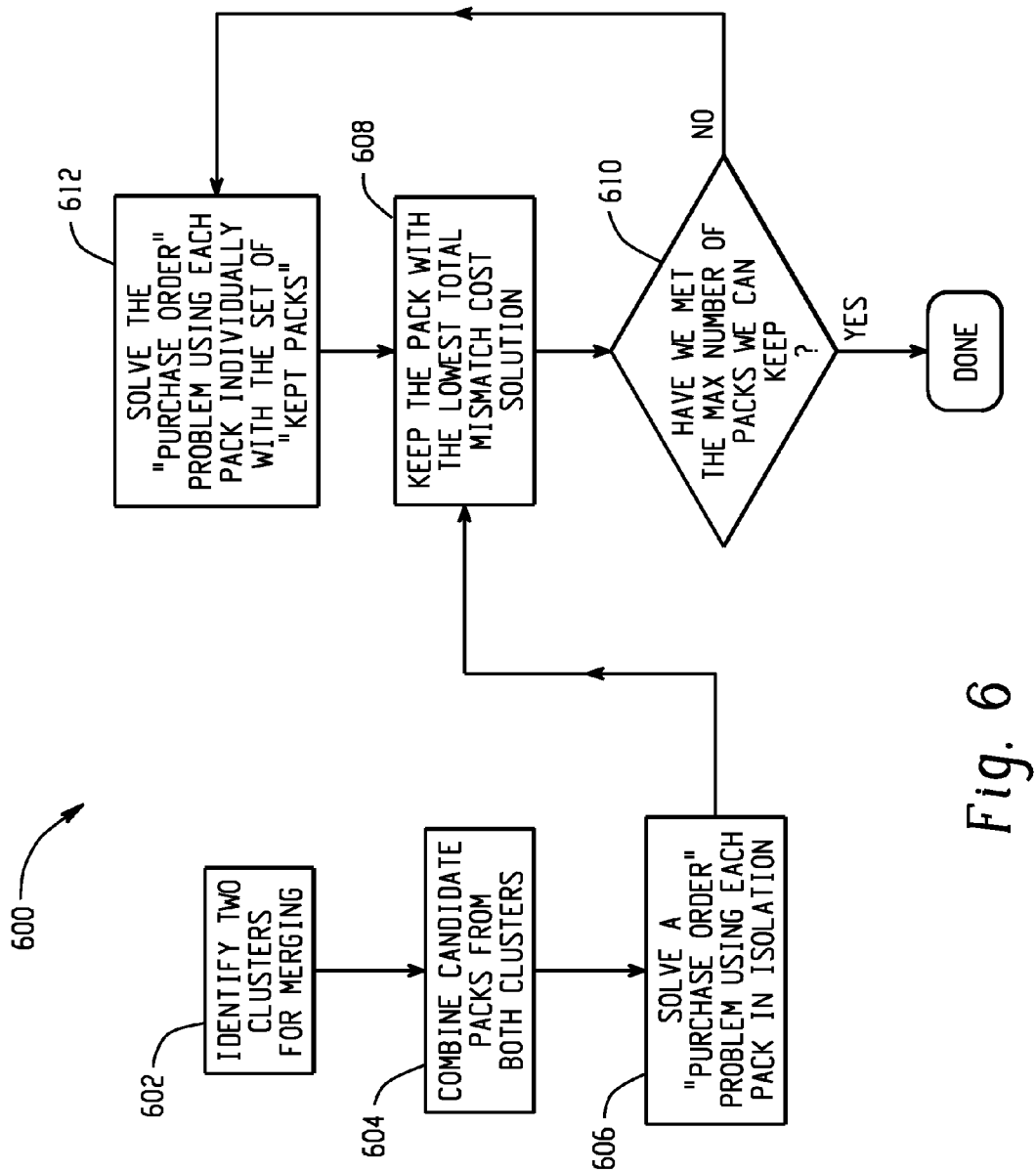
FIG. 6 is a flow diagram depicting an example process for combining clusters.

FIG. 6 is a flow diagram depicting an example process for combining clusters. At 602, the pack configuration engine determines which clusters to combine by favoring those clusters whose stores have similar size needs (e.g., in terms of percentages or magnitude) that are associated with the same distribution center. For example, clusters to be merged may be determined using a cluster distance metric:

Cluster Distance Metric=(100*Size Profile Difference)+(50*Sales Difference)+(100*DC Difference)

where Size Profile Difference=SUM(($pct\_{skui,\ cluster1}$−$pct\_{skui,\ cluster2})^2$)=sum of squared differences between the percentage demand for each size across the two clusters, sales difference=abs(((total demand$_{cluster1}$/number of stores$_{cluster1}$/number of SKUs)−(total demand$_{cluster2}$/number of stores$_{clusters}$/number of SKUs))/10)=the absolute value of the difference between the average sales per store and SKU at each cluster, divided by 10, and DC Difference=(min(num dcs$_{cluster1}$, num dcs$_{cluster2}$)−number of overlapping DCs)/min (num dcs$_{cluster1}$, num dcs$_{cluster2}$)=percentage overlap of DCs across clusters.

When two clusters have been identified at 602 for merging at 604, the packs in the two clusters are reduced by solving a simplified purchase order problem at 606. Such a problem may be performed using a stepwise selection, incrementally adding one pack at a time.

For each candidate pack in the merged cluster, at 608, the pack configuration engine determines the total mismatch cost for all stores in the cluster if that is the only pack configuration used. These costs may be saved and reused across steps and across evaluations, offering sometimes significant efficiency improvements. That determined cost is weighted higher if a constraint is violated by the pack configuration (e.g., the pack does not include a required variation). The single pack with the lowest mismatch cost is retained as the first best pack for the cluster and is kept. If the maximum pack configuration constraint permits more than one pack to be selected 610, then the pack configuration engine solves the ordering problem again at 612 with each remaining pack plus the first best pack for the process. This process 608, 610, 612 is repeated, adding one pack configuration at a time, until the maximum pack configuration constraint would be violated or another criterion is met. For example, other criteria could include keeping pack configurations according to the following.

Min((Maximum Pack Configuration Constraint/Number of Clusters Remaining)+2,Maximum Pack Configuration Constraint)

All unused pack configurations are discarded for the cluster, although discarded pack configurations may still be candidate packs in another cluster. Certain packs may be retained as "user packs," which are pack configurations that may be usable no matter which custom pack configurations are generated. These user packs may be received as input from the user and may be used regardless of the maximum number of allowable pack configurations. Clusters are combined until the pack configuration engine has reduced the total number of distinct candidate packs in all clusters to meet the maximum pack configuration constraint. Because the same packs may be re-evaluated multiple times each time the cluster is involved in a merge, the pack configuration engine may retain the resulting cost from each pack or set of packs in the cluster and avoid re-computing the mismatch cost each time a merge is performed.

Following is a numerical example for selecting pack configurations. This example contains 4 stores and 5 variations of a product (sizes). The stores' planned quantities are distributed among 2 different size profiles seen below with the exception that one store, #322, does not stock size XL. The two size profiles are as follows:

TABLE 4

| Size Profiles | | |
| --- | --- | --- |
| Size | Profile 1 | Profile 2 |
| XS | 0.09 | 0.12 |
| S | 0.23 | 0.31 |
| M | 0.30 | 0.45 |
| L | 0.26 | 0.09 |
| XL | 0.12 | 0.03 |

The total product demand is forecast for each store, and the individual variety demands for each size at each store are calculated by multiplying the total product demand for the store by the values in the size profiles.

TABLE 5

| Per Store Per Size Demand Forecasts | | | |
| --- | --- | --- | --- |
| Store | Total Desired Quantity | Size | Size Quantity |
| 311 | 17 | XS | 1.53 |
| | | S | 3.91 |
| | | M | 5.1 |
| | | L | 4.42 |
| | | XL | 2.04 |
| 312 | 50 | XS | 4.5 |
| | | S | 11.5 |
| | | M | 15 |
| | | L | 13 |
| | | XL | 6 |
| 321 | 16 | XS | 1.92 |
| | | S | 4.96 |
| | | M | 7.2 |
| | | L | 1.44 |
| | | XL | 0.48 |
| 322 | 33 | XS | 4.08 |
| | | S | 10.54 |
| | | M | 15.3 |
| | | L | 3.06 |
| | | XL | 0 |

Figure 7:
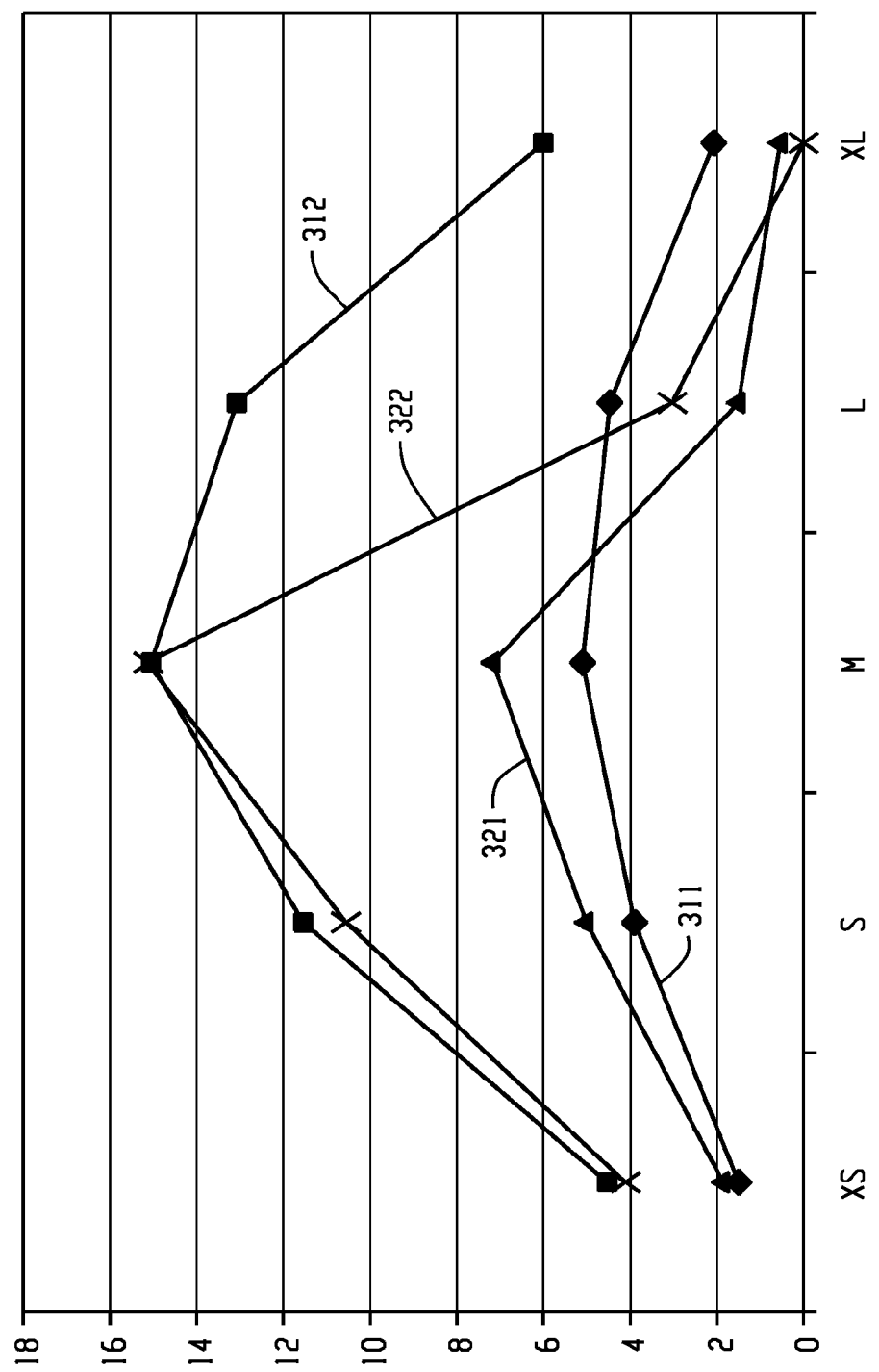
FIG. 7 is a chart depicting forecasted demand for each size at a set of stores.

FIG. 7 is a chart depicting forecasted demand for each size at each store. Stores 311 and 312 have a more normal distribution of sizes while stores 321 and 322 skew toward the smaller sizes. For this example, allowable pack sizes are of 6 units or 8 units each. The maximum pack configuration constraint is 2 packs.

Performing the processes described above, selecting a first, ideal pack, and second complementary packs, results in the following store pack configuration sets.

Store 311:
1-2-2-2-1
1-2-0-2-1
Store 312:
1-2-2-2-1
0-2-3-2-1
1-2-0-2-1
1-1-1-2-1
0-1-3-1-1
Store 321:
1-2-4-1-0
1-2-2-1-0
Store 322:
1-2-4-1-0
1-3-4-0-0
0-2-3-1-0
1-2-3-0-0
1-2-2-1-0

This process offers ten unique candidate packs from which to choose. Because the above described process utilizes more than simple rounding of forecasted demands, a rich set of candidate packs is generated.

Clusters are merged to generate a final two packs as a cluster pack configuration set.

TABLE 6

| Candidate Packs | | |
| --- | --- | --- |
| Size | Pack 1 | Pack 2 |
| XS | 1 | 1 |
| S | 2 | 2 |
| M | 2 | 4 |
| L | 2 | 1 |
| XL | 1 | 0 |

The following table depicts the mismatch costs associated with the selected candidate packs.

TABLE 7

| Mismatch Costs for Selected Candidate Packs | | | | | |
| --- | --- | --- | --- | --- | --- |
| Store | Size | Planned Quantity | Units Received | Units Over | Units Under |
| 311 | XS | 1.53 | 2 | 0.47 | 0 |
| | S | 3.91 | 4 | 0.09 | 0 |
| | M | 5.1 | 4 | 0 | 1.1 |
| | L | 4.42 | 4 | 0 | 0.42 |
| | XL | 2.04 | 2 | 0 | 0.04 |
| 312 | XS | 4.5 | 6 | 1.5 | 0 |
| | S | 11.5 | 12 | 0.5 | 0 |
| | M | 15 | 12 | 0 | 3 |
| | L | 13 | 12 | 0 | 1 |
| | XL | 6 | 6 | 0 | 0 |
| 321 | XS | 1.92 | 2 | 0.08 | 0 |
| | S | 4.96 | 4 | 0 | 0.96 |
| | M | 7.2 | 8 | 0.8 | 0 |
| | L | 1.44 | 2 | 0.56 | 0 |
| | XL | 0.48 | 0 | 0 | 0.48 |
| 322 | XS | 4.08 | 4 | 0 | 0.08 |
| | S | 10.54 | 8 | 0 | 2.54 |
| | M | 15.3 | 16 | 0.7 | 0 |
| | L | 3.06 | 4 | 0.94 | 0 |
| | XL | 0 | 0 | 0 | 0 |
| Total | | | | 5.64 | 9.62 |

The selected candidate packs result in a mismatch cost of 15.26.

In addition to generating pack configurations for vendors to use in providing product, a pack management engine may provide purchase order recommendations by determining a quantity of each of a plurality of inner pack configurations to purchase for a plurality of stores. Each store may be associated with a distribution center, such that purchase decisions are made at the distribution center level for the stores associated with that distribution center. Product is delivered to the distribution center, which distributes the delivered product to the associated stores according to store level demand. A purchase order of inner pack configurations for a distribution center may be determined by the pack management engine based on a sum of inner pack configurations that would near-optimally satisfy the demand of associated stores. Purchase order generation may be subject to one or more constraints. For example, the distribution center may be subject to a constraint to purchase units of the product by whole outer packs. Thus, allotments to individual stores may need to be adjusted to meet this and other constraints.

Figure 8:
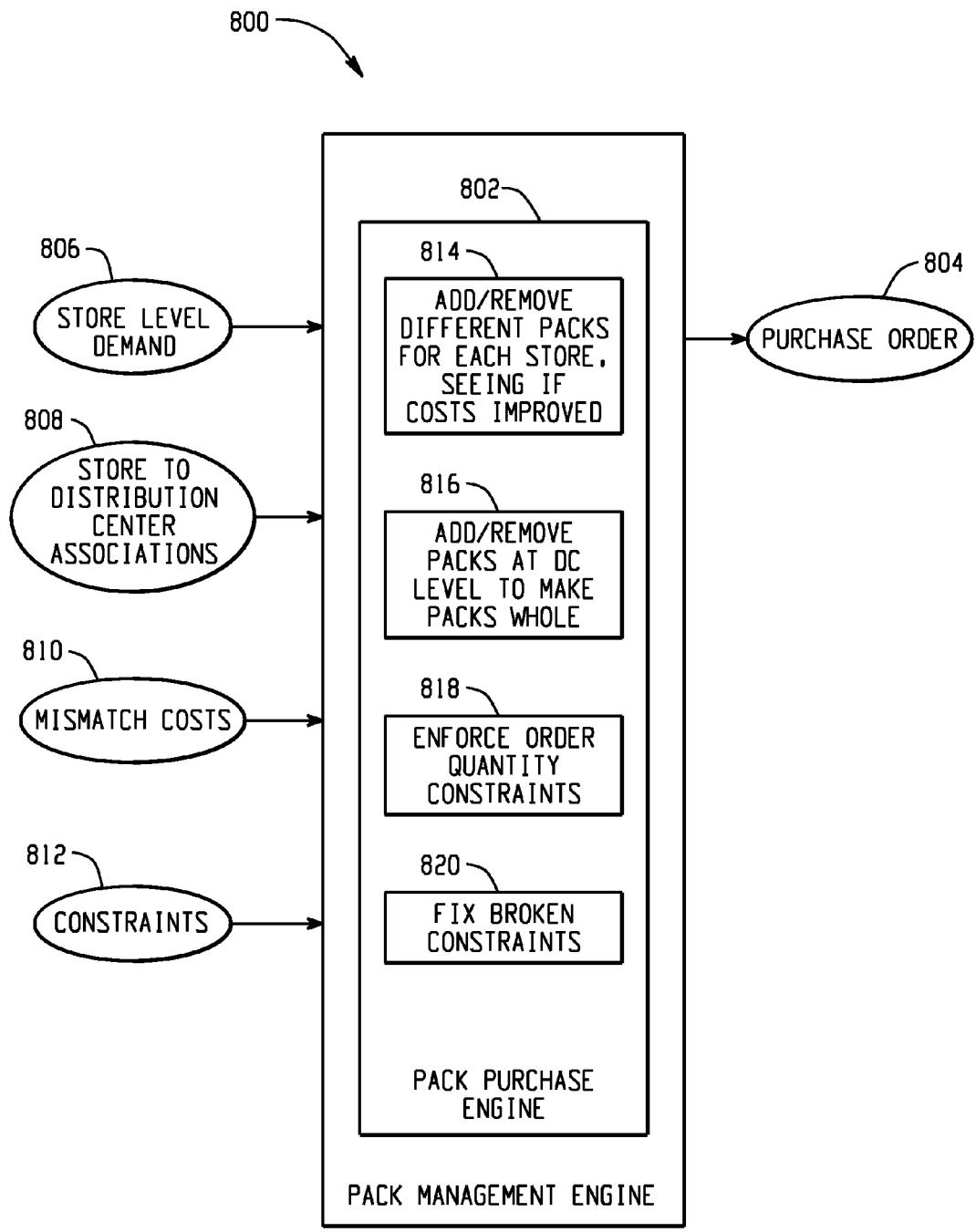
FIG. 8 is a block diagram depicting example operations that may be performed by a pack purchase engine.

FIG. 8 is a block diagram depicting example operations that may be performed by a pack purchase engine. A pack purchase engine 802 generates a purchase order 804 based on received data that may include store level demand 806, store to distribution center associations 808, mismatch costs 810, and constraints 812. The pack purchase engine 802 receives an identification of available inner pack configurations and a particular number of each inner pack configuration contained in an outer pack. The pack purchase engine 802 adds and removes different packs from the set of inner pack configurations for each store, as shown at 814, based on whether adding and removing those inner pack configurations would improve mismatch costs at that store. Once assortments of inner packs are determined at each store associated with a distribution center, the totals for each inner pack configuration are generated. If the distribution center is subject to a full outer pack purchase constraint, inner packs may be added or subtracted from the distribution center purchase order 804 in a manner that has a small effect on mismatch costs, as shown at 816. Allocations to individual stores associated with the distribution center may be updated based on the adding and subtracting of inner packs at 816.

Additional operations that a pack purchase engine 802 may perform include enforcing order quantity constraints 818 and fixing broken constraints 820. Order quantity constraints could include minimums or maximums on different variations of the product that must be ordered for each store, minimums or maximums on different types of inner pack configurations that must be ordered for each store, minimums or maximums on total purchase order size at the total company level, as well as others. Constraints may also be fixed in a manner that does not violate other constraints and has a least effect on mismatch costs. If an adjustment is made at the distribution center level, orders for individual stores may be updated to match those adjustments. Determinations of which stores to update may be done by determining which stores would result in a least negative effect on overall mismatch costs. Alternatively, the updates may be done randomly, pseudo-randomly, in a round-robin fashion, or otherwise so that particular stores are not burdened by constraint fixing updates on a disproportionate basis.

Figure 9:
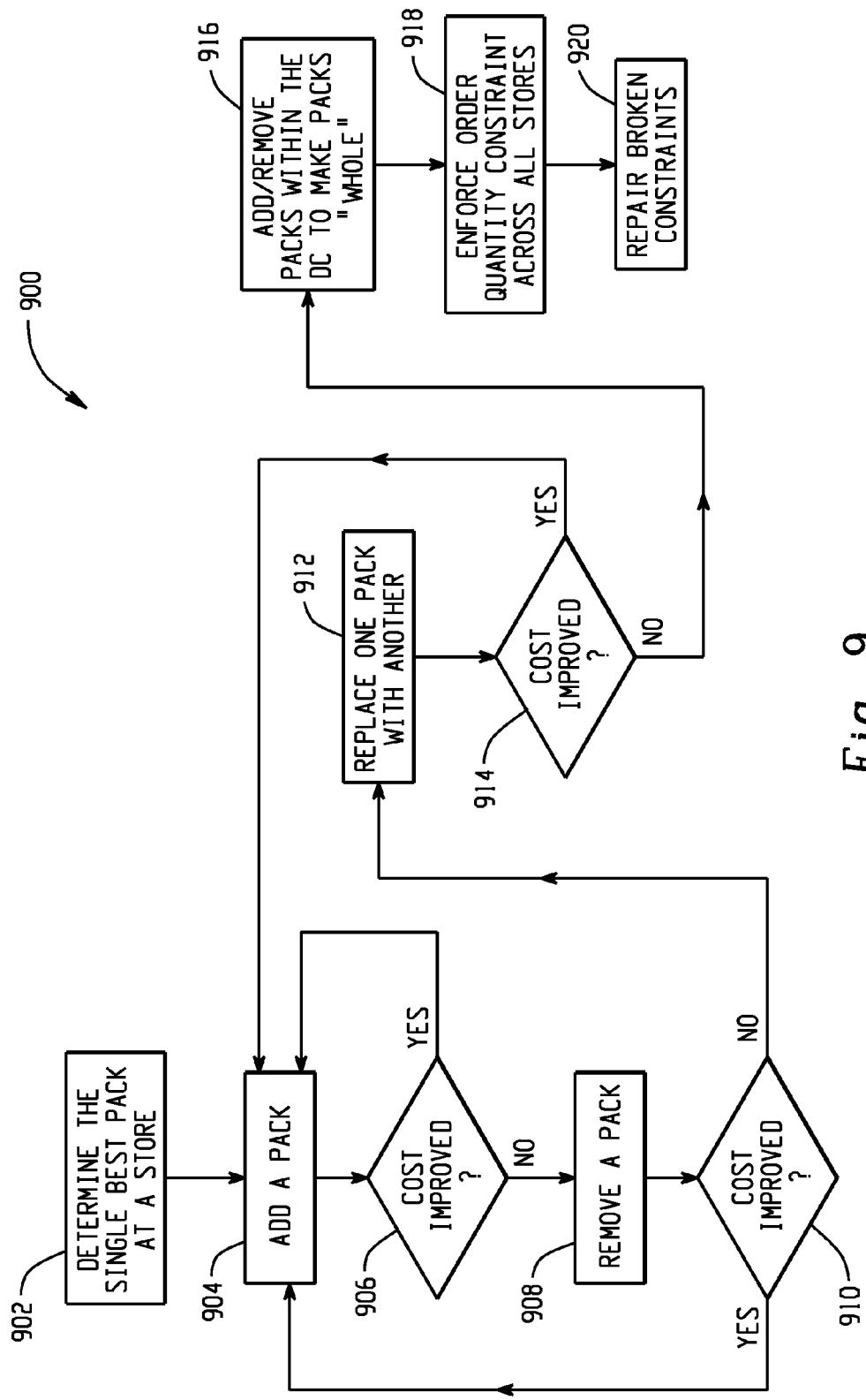
FIG. 9 is a flow diagram depicting an example process for generating a purchase order.

FIG. 9 is a flow diagram depicting an example process for generating a purchase order. The pack purchase engine begins with a single-pack solution and incrementally improves the solution by examining other pack configurations and trading packs to improve the outcome for each store. After each store's order has been determined, the order is adjusted to account for other business constraints. At 902, a pack purchase engine determines the single best pack at a store. The single best pack is determined by calculating how many inner packs of each available pack configuration could be purchased before the need for any variation of the product is exceeded based on the demand levels of that store, assuming only a single pack configuration is used. The pack purchase engine determines the single pack configuration with the lowest mismatch cost at the sub-demand exceeding quantity as the best pack for that store. Each store may have a different best pack.

From the starting solution, the pack purchase engine attempts to add an inner pack to the purchase order for the store at 904. If any available pack configuration can be added to the store purchase order that will not violate a constraint (e.g., a store level constraint on pack types, a store level constraint on order quantity of the product) and reduces mismatch cost at the store 906, a single inner pack of that inner pack configuration is added to the store purchase order. Inner packs may be added to the store purchase order until no improvement is found. Inner packs may also be added to fulfill minimum order constraints, such as a store level minimum purchase quantity or a store level pack configuration type minimum purchase constraint. Such additions may be implemented even if mismatch costs would rise.

At 908, the pack purchase engine attempts to remove an inner pack from a store purchase order to improve mismatch costs for the store. If removing any inner pack can be done without violating any store level constraints and such removal improves mismatch costs or fixes a constraint, the inner pack is removed 910. If a pack is removed, then the pack purchase engine may again attempt to add an available inner pack configuration to improve mismatch costs. Packs are removed at 908, 910 until no further improvement is found. Packs may also be removed to meet constraints such as store order maximums and store pack configuration maximums. Such removals may be implemented even if mismatch costs would rise.

At 912, 914, the pack purchase engine attempts to replace packs within each store with other available pack configurations to improve mismatch costs without violating constraints. In some instances, these replacements may not be one-for-one (e.g., remove two of a first inner pack configuration and replace with one of a second inner pack configuration, remove one of a first inner pack configuration and replace with three of a second inner pack configuration). If mismatch costs improve after the replacement, then the replacement in the store purchase order is made. Each pack that is currently in the purchase order may be evaluated against each available pack configuration. The exchange step 912 can also be performed to fix constraints in cases where the addition of an inner pack violates a constraint and the removal of an inner pack also violates a constraint. By exchanging inner packs, the pack purchase engine may be able to find a solution that satisfies all constraints. If an exchange is made that improves costs or fixes a constraint, the process begins again from the adding step. The process completes when no cost improvement can be made or when a maximum iteration counter is exceeded.

At 916, 918, and 920, the pack purchase engine attempts to repair constraints, such as constraints at the distribution center level. For example, orders for a distribution center may be required to be at the whole outer pack level, despite the sum of store inner pack purchase orders not totaling a whole number of outer packs. As another example, across all stores, a constraint may be imposed that no more than X and no less than Y units of a product or variation of a product may be ordered. Other example constraints include store level constraints on the minimum or maximum of each type of pack configuration that may be received and a minimum and maximum number of product or variations of a product that the store is able to stock and display at one time.

To address the whole outer pack constraint, the pack purchase engine may round the inner pack quantities within each distribution center so that whole outer packs are ordered. For example, if 50 inner packs are desired among the stores at a distribution center but the outer pack consists of 6 inner packs, then the pack purchase engine determines whether to order 8 outer packs, which result in 48 inner packs, two fewer than the preferred number, or 9 outer packs, which result in 54 inner packs, four more than the preferred number of 50. The pack purchase engine rounds in the direction that incurs the smaller additional mismatch cost across all stores unless such rounding would break order quantity or pack type constraints. Suppose the "cheaper" solution is to round down. Because two stores will be shorted a desired inner pack, the pack purchase engine will determine which two stores to short. For example, the pack purchase engine may remove or add inner packs one at a time from the store that would incur the smallest mismatch cost, favoring stores for which the change will fix a constraint on either pack types or order quantity and avoiding any store for which the change will break a constraint.

The pack purchase engine may also attempt to enforce any constraints on the order quantity that must be satisfied across all stores at 918. For example, if a budgetary constraint requires that a retailer purchase no more than 10,000 units across all stores, then the purchase order may be adjusted to ensure that this condition is met. When the condition is not met by the initial solution, it may be time consuming to adjust the pack order quantities to meet the constraint and still maintain the quality of the initial solution. The pack purchase engine may determine which packs affect the unmet constraint (some packs may not contain the same products) and evaluate the cost change generated by adding or removing one inner pack of each of those affected packs at each store. This cost may be weighted based on any constraints violated or corrected as follows:

Weighted Cost$_{pack\ i,\ store\ j}$ = Cost$_{pack\ i,\ store\ j}$ + (Cost$_{pack\ i,\ store\ j}$*1000*flag indicating constraint violation$_{store\ j}$) − (Cost$_{pack\ i,\ store\ j}$*flag indicating constraint correction$_{store\ j}$)

The pack order engine may rank the stores by increasing value of the weighted cost and make multiple pack changes before re-calculating the cost of each pack change at each store. In this way, the pack adjustments can be made more efficiently.

The pack purchase engine may also attempt to repair any constraints that may have become broken by the previous changes at 920. The pack purchase engine may impose a priority on each constraint based on the stated needs of retailers. For example, total company order quantity constraints may take precedence over pack type constraints at each store which may take precedence over order quantity constraints within each store. As the pack purchase engine attempts to repair a constraint, the pack purchase engine attempts to do so without violating any other constraints. If repairing a lower-priority constraint will break a higher-priority constraint, then the repair is made only if some other pack exists that can repair the higher-priority constraint.

The following example illustrates a purchase order problem for a product with 4 sizes (S-M-L-XL). In this example, there are three pack configurations available:

TABLE 8

Pack Configurations Available

| Size | Pack 1 Quantity | Pack 2 Quantity | Pack 3 Quantity |
|---|---|---|---|
| S | 1 | 2 | 1 |
| M | 3 | 3 | 2 |
| L | 3 | 2 | 3 |
| XL | 1 | 1 | 2 |

Note that all packs include 8 units. In the example, packs may not be opened (there is only one inner pack in the outer pack) and the cost of shipping an outer pack to a store is $0.02. This example includes 214 stores with the store size quantities being distributed among one of the following profiles:

TABLE 9

Store Demand Profiles

| Size | Profile 1 | Profile 2 | Profile 3 | Profile 4 | Profile 5 | Profile 6 |
|---|---|---|---|---|---|---|
| S | 0.1522 | 0.1245 | 0.1837 | 0.1797 | 0.0902 | 0.0632 |
| M | 0.3255 | 0.2876 | 0.3543 | 0.2738 | 0.3989 | 0.2045 |
| L | 0.3350 | 0.4001 | 0.3005 | 0.2960 | 0.2953 | 0.3397 |
| XL | 0.1874 | 0.1878 | 0.1615 | 0.2505 | 0.2156 | 0.3927 |

The stores conform to the above profiles as follows.

TABLE 10

Store to Profile Mapping

| Profile | Number of Stores |
|---|---|
| 1 | 128 |
| 2 | 24 |
| 3 | 33 |
| 4 | 14 |
| 5 | 13 |
| 6 | 2 |

Multiplying a forecasted demand for each store by the associated demand profile for the store generates the following planned quantities for each store (only 6 stores shown).

TABLE 11

Planned Quantities Per Store

| Store | Small | Medium | Large | X-Large |
|---|---|---|---|---|
| 1 | 5.105 | 11.7932 | 16.4026 | 7.6993 |
| 2 | 5.6306 | 12.042 | 12.395 | 6.932 |
| 3 | 6.0614 | 11.6926 | 9.9172 | 5.3287 |
| 4 | 2.8869 | 12.7644 | 9.4489 | 6.8998 |
| 5 | 3.9696 | 17.5510 | 12.9922 | 9.4872 |
| 6 | 6.0871 | 13.0184 | 13.4001 | 7.4943 |

The planned order quantities for each store are not very large compared to the pack sizes. In general, each store needs approximately 4 or 5 packs to meet its needs. In this example, each store has a minimum order quantity of 24 units (3 packs) but no order maximum. There are no other constraints such as pack type constraints or total company order quantity constraints.

The pack purchase engine solves for each store's ideal order and then attempts to enforce constraints across stores. In this case, there are no cross-store constraints to meet, such as a total company order minimum or maximum constraint. The pack purchase engine generates the following result (only 6 stores shown).

TABLE 12

Purchase Order

| Store | Pack Configuration | Quantity | Handling Cost |
|---|---|---|---|
| 1 | 1 | 2 | 0.04 |
| 1 | 2 | 0 | 0.00 |
| 1 | 3 | 3 | 0.06 |
| 2 | 1 | 2 | 0.04 |
| 2 | 2 | 1 | 0.02 |
| 2 | 3 | 2 | 0.04 |
| 3 | 1 | 1 | 0.02 |
| 3 | 2 | 2 | 0.04 |
| 3 | 3 | 1 | 0.02 |

TABLE 12-continued

| Purchase Order | | | |
|---|---|---|---|
| Store | Pack Configuration | Quantity | Handling Cost |
| 4 | 1 | 1 | 0.02 |
| 4 | 2 | 0 | 0.00 |
| 4 | 3 | 3 | 0.06 |
| 5 | 1 | 1 | 0.02 |
| 5 | 2 | 0 | 0.00 |
| 5 | 3 | 4 | 0.08 |
| 6 | 1 | 2 | 0.04 |
| 6 | 2 | 1 | 0.02 |
| 6 | 3 | 2 | 0.04 |

This result has the following quantities and mismatch amounts per store (only 6 stores shown). In this example, the mismatch costs vary for each size and store but in general, over-stocking was preferred to under-stocking and so the cost of being over was slightly lower than the cost of being under.

TABLE 13

| Mismatch Costs | | | | |
|---|---|---|---|---|
| Store | Size | Demand | Quantity Ordered | Quantity Over (Under) | Mismatch Cost Generated |
| 1 | Small | 5.105 | 5 | (0.105) | 0.51356 |
| 1 | Medium | 11.7932 | 12 | 0.2067 | 0.74805 |
| 1 | Large | 16.4026 | 15 | (1.4026) | 4.70162 |
| 1 | X-Large | 7.6993 | 8 | 0.3007 | 1.24069 |
| 2 | Small | 5.6306 | 6 | 0.3694 | 1.59101 |
| 2 | Medium | 12.042 | 13 | 0.9579 | 3.28272 |
| 2 | Large | 12.395 | 14 | 1.6049 | 5.42135 |
| 2 | X-Large | 6.932 | 7 | 0.0677 | 0.27947 |
| 3 | Small | 6.0614 | 6 | (0.0615) | 0.2805 |
| 3 | Medium | 11.6926 | 11 | (0.6926) | 2.49821 |
| 3 | Large | 9.9172 | 10 | 0.0828 | 0.29419 |
| 3 | X-Large | 5.3287 | 5 | (0.3287) | 1.53996 |
| 4 | Small | 2.8869 | 4 | 1.113 | 5.14429 |
| 4 | Medium | 12.7644 | 9 | (3.7644) | 12.6409 |
| 4 | Large | 9.4489 | 12 | 2.5511 | 9.13294 |
| 4 | X-Large | 6.8998 | 7 | 0.1002 | 0.3993 |
| 5 | Small | 3.9696 | 5 | 1.0304 | 4.76251 |
| 5 | Medium | 17.5510 | 11 | (6.551) | 21.9983 |
| 5 | Large | 12.9922 | 15 | 2.0078 | 7.18792 |
| 5 | X-Large | 9.4872 | 9 | (0.4872) | 2.13491 |
| 6 | Small | 6.0871 | 6 | (0.0871) | 0.41251 |
| 6 | Medium | 13.0184 | 13 | 0.0184 | 0.06306 |
| 6 | Large | 13.4001 | 14 | 0.6 | 2.0268 |
| 6 | X-Large | 7.4943 | 7 | (0.4943) | 2.24412 |

TABLE 14

| Final Costs for Pack Purchase Engine Solution | | |
|---|---|---|
| Total Handling Cost | Total Mismatch Cost | Total Cost of the Solution |
| 21.28 | 2268.985 | 2290.265 |

A pack management engine may also be used for decision making after purchase orders are provided to a vendor and the vendor confirms units of the product to be delivered. At that point, a retailer may be able to direct units of the product to different distribution centers for subsequent distribution to stores using a pack distribution engine. Once units of the product are delivered to a distribution center, the pack distribution engine may also be utilized to determine how to distribute the delivered units of the product to stores associated with the distribution center.

Figure 10:
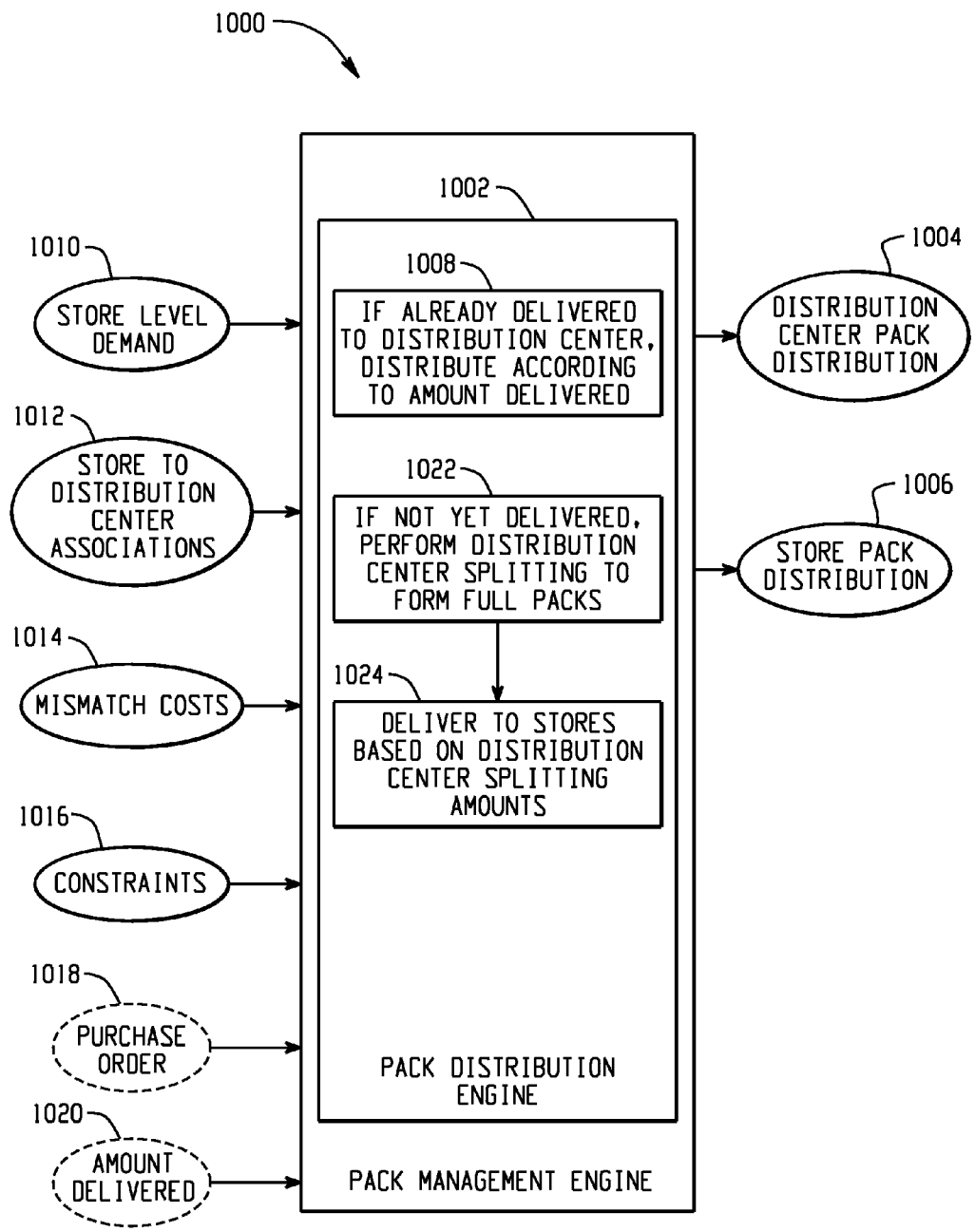
FIG. 10 is a block diagram depicting a pack distribution engine.

FIG. 10 is a block diagram depicting a pack distribution engine. A pack distribution engine 1002 may receive a number of input data values in generating a distribution center pack distribution plan 1004 or a store pack distribution plan 1006. If units of the product have been delivered to a distribution center, then the pack distribution engine determines a store pack distribution plan 1006, as shown at 1008. The store pack distribution plan 1006 identifies how units of the product delivered to the distribution center should be allocated to the stores associated with the distribution center. The pack distribution engine may consider store level demand data 1010, store to distribution center associations 1012, mismatch costs 1014, constraints 1016, purchase order amounts 1018, and amounts of the product delivered 1020 to the distribution center in determining how to allocate the delivered units of the product to the stores associated with the distribution center as a store pack distribution plan 1006.

A retailer may also have an opportunity to direct units of the product manufactured by a vendor to different distribution centers when the vendor identifies how many units that the vendor will provide. Purchase orders for units of the product may have identified to which distribution center the units of the product should be sent. However, in a number of situations, distributing according to the purchase order may be suboptimal. For example, demand for the product may have changed in the period of time between sending the purchase order to the vendor and completion of manufacture of the product. Additionally, amounts of the product delivered by the vendor may differ from amounts identified in the purchase order. The vendor may over or undersupply the units of the product ordered or alter the pack configurations, and the retailer may need to adjust accordingly. If the units of the product have not yet been delivered to the distribution centers, a pack distribution engine 1002 may perform distribution center splitting (DC Splitting) to determine the distribution of units of the product provided by the vendor to different distribution centers 1004, as shown at 1022. The pack distribution engine 1002 may further determine a store pack distribution plan 1006, as shown at 1024, based on the distribution center splitting determination at 1022.

Figure 11:
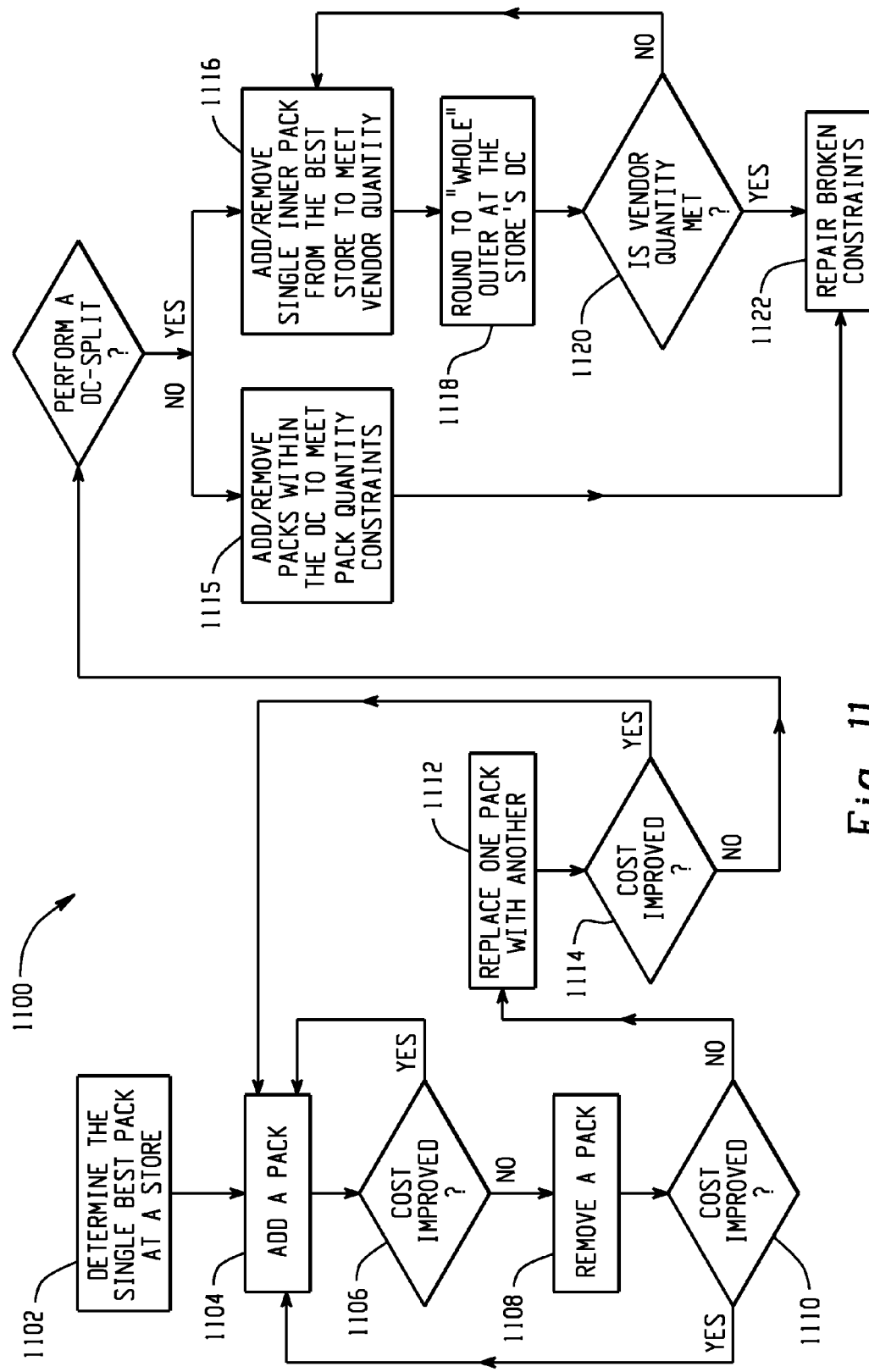
FIG. 11 is a flow diagram depicting example operations of a pack distribution engine.

FIG. 11 is a flow diagram depicting example operations of a pack distribution engine. The pack distribution engine may determine initial pack configuration quantities for a plurality of stores in a similar manner as described with respect to portions of FIG. 9 in generating purchase orders for stores. The initial pack configuration quantities may be calculated by the pack distribution engine to generate up to date ideal distribution plans for stores that may differ from purchase orders for those stores based in shifts in demand or other variables.

The pack distribution engine may begin with a single-pack solution and incrementally improve the solution by examining other pack configurations and trading packs to improve the outcome for each store. After each store's initial pack configuration quantities have been determined, those quantities may be adjusted to account for other business constraints. At 1102, a pack distribution engine determines the single best pack at a store. The single best pack is determined by calculating how many inner packs of each available pack configuration could be provided before the need for any variation of the product is exceeded based on the demand levels of that store, assuming only a single pack configuration is used. The pack distribution engine determines the single pack configuration with the lowest mismatch cost at the sub-demand exceeding quantity as the best pack for that store. Each store may have a different best pack.

From the starting solution, the pack distribution engine attempts to add an inner pack to the initial pack configuration quantities for the store at 1104. If any available pack configuration can be added to the initial pack configuration quantity that will not violate a constraint (e.g., a store level constraint on pack types, a store level constraint on order quantity of the product) and reduces mismatch cost at the store 1106, then a single inner pack of that inner pack configuration is added to the initial pack configuration quantity. Inner packs may be added to the store initial pack configuration quantity until no improvement is found Inner packs may also be added to fulfill minimum order constraints, such as a store level minimum quantity or a store level pack configuration minimum constraint. Such additions may be implemented even if mismatch costs would rise.

At 1108, the pack distribution engine attempts to remove an inner pack from a store initial pack configuration quantity order to improve mismatch costs for the store. If removing any inner pack can be done without violating any store level constraints and such removal improves mismatch costs, the inner pack is removed 1110. If a pack is removed, then the pack distribution engine may again attempt to add an available inner pack configuration to improve mismatch costs. Packs are removed at 1108, 1110 until no further improvement is found. Packs may also be removed to meet constraints such as store order maximums and store pack configuration maximums. Such removals may be implemented even if mismatch costs would rise.

At 1112, 1114, the pack distribution engine attempts to replace packs within each store with other available pack configurations to improve mismatch costs without violating constraints. In some instances, these replacements may not be one-for-one (e.g., remove two of a first inner pack configuration and replace with one of a second inner pack configuration, remove one of a first inner pack configuration and replace with three of a second inner pack configuration). If mismatch costs improve after the replacement, then the replacement in the initial pack configuration quantity is made. Each pack that is currently in the initial pack configuration quantity may be evaluated against each available pack configuration. The exchange step 1112 can also be performed to fix constraints in cases where the addition of an inner pack violates a constraint and the removal of an inner pack also violates a constraint. By exchanging inner packs, the pack distribution engine may be able to find a solution that satisfies all constraints. If an exchange is made that improves costs or fixes a constraint, the process begins again from the adding step. The process completes when no cost improvement can be made or when a maximum iteration counter is exceeded.

Having initial plans for distribution of units of product to stores, the pack distribution engine generates a distribution center pack distribution plan if units of the product have not yet been delivered to distribution centers, or the pack distribution engine generates a store pack distribution plan if the units of the product have already been delivered to the distribution centers. To generate a store pack distribution plan at 1115, the pack distribution engine adjusts the pack quantities at each store within each distribution center to reflect the quantity of each pack configuration available at the distribution center.

Generation of a distribution center pack distribution plan is illustrated at 1116, 1118, 1120. The pack distribution engine solution adjusts the pack quantities at each store to reflect the available quantity at the vendor at 1116 and also may ensure that packs that are to be delivered to distribution centers are "whole" 1118. That is, all inner packs among the stores associated with a single distribution center must add up to whole outer packs within the distribution center. The pack distribution engine adds or removes inner packs one at a time from the store that would incur the smallest mismatch cost at 1116. The pack distribution engine may favor stores for which the change will fix a constraint on either pack types or allocation quantity, and the pack distribution engine may avoid any store for which the change will break a constraint. The pack distribution engine may implement a fair-sharing of burden, such that no one store will have to accommodate all the excess or shortage in any allocation even if that is the "cheapest" solution.

At 1118, after the vendor quantity of packs is met, packs may be shifted among the stores of different distribution centers to accommodate the rounding to whole outer packs. The pack distribution engine may select a single donor store from a candidate distribution center at which the packs are not "whole". The donor store selected is the store that incurs the smallest mismatch cost (or receives a benefit) when the pack is removed. A receiver store is selected from the remaining distribution centers at which this pack is not whole. The receiver store is the store at the remaining distribution centers that incurs the least cost (or receives a benefit) from accepting the pack. When selecting donor and receiver stores, preference is given to those stores for which a business constraint will be fixed by the change and stores for which a constraint will be broken are avoided. This is repeated until all packs are "whole" at all distribution centers.

Figure 12:
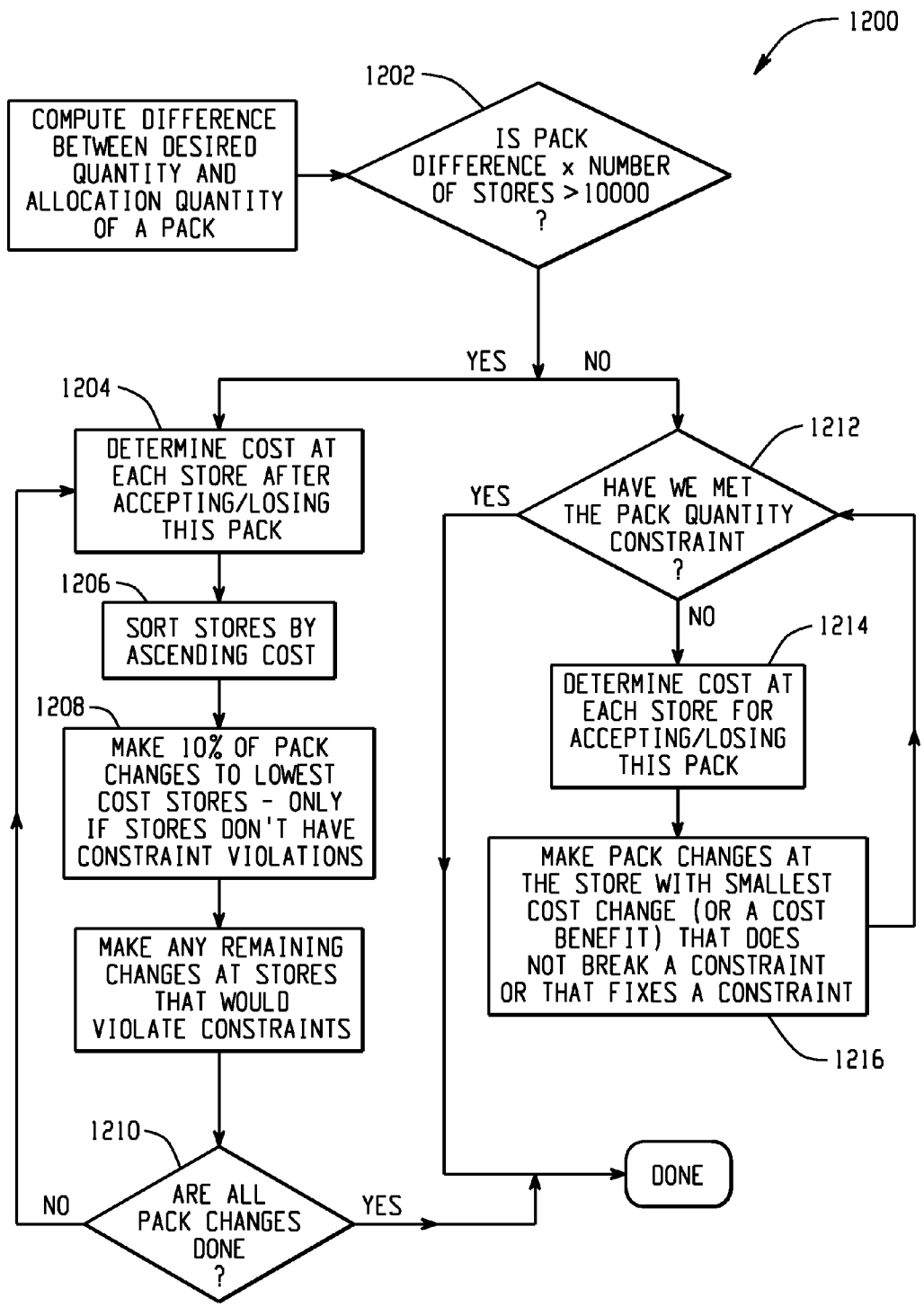
FIG. 12 is a flow diagram depicting example operations for bulk adjustment in pack distribution plans.

Shifting inner pack configurations among stores may become processing inefficient when the amount of product provided by a vendor is vastly different from the amount of product expected. As noted above, a pack distribution engine may evaluate stores and adjust distribution plans a single pack at a time. FIG. 12 is a flow diagram depicting example operations for bulk adjustment in pack distribution plans. When the difference between the expected, desired quantity is vastly different (e.g., 10,000 units different) from the available quantity 1202, the pack distribution engine may evaluate the cost change associated with all possible pack changes at all stores and rank those store pack changes by a cost function 1206. The cost function may include the mismatch cost change generated at the store for accepting or losing each pack and may be weighted up when a constraint is violated or down if a constraint is improved. The pack distribution engine may then evaluate this list of store pack changes in order of increasing value of the cost function and make 10% of the necessary pack changes 1208 before re-evaluating the cost of changing each pack quantity at each store 1204. In this way, many pack changes may be made more rapidly than evaluating each pack change at each store after every single pack change. The pack distribution engine may adjust allocations to make sure that constraints are met 1210 and then further allocate the difference to additional stores following a reassessment of the mismatch costs. When the difference between the expected, desired quantity is not vastly different from the available quantity, then allocations/deallocations may be made at the single inner pack level at 1212, 1214, 1216.

With reference to FIG. 11 at 1122, the pack distribution engine has allocated all packs but has not necessarily satisfied other business constraints. Stores may have constraints on the minimum or maximum quantity of each type of pack they may accept, and individual stores may have constraints on the minimum and maximum number of units of a product they can stock and display at one time. The pack distribution engine attempts to repair any constraints that were not met or may have become broken by the allocations. The pack distribution engine may impose a priority on each constraint based on the needs of retailers. Pack allocation quantity constraints may take precedence over all other constraints. Pack type constraints at each store take precedence over display quantity constraints within each store. As the pack distribution engine attempts to repair any constraint, the pack distribution engine attempts to do so without breaking any other constraint. If repairing a lower-priority constraint will break a higher-priority constraint, then the repair is made only if some pack exists that can repair the higher-priority constraint.

The following example illustrates a distribution plan generation for a product with 4 sizes (S-M-L-XL). In this example, there are four packs available:

TABLE 15

Pack Configurations Available

| Size | Pack 1 Quantity | Pack 2 Quantity | Pack 3 Quantity | Pack 4 Quantity |
|---|---|---|---|---|
| S | 2 | 0 | 0 | 0 |
| M | 0 | 2 | 0 | 0 |
| L | 0 | 0 | 2 | 0 |
| XL | 0 | 0 | 0 | 2 |

Each outer pack has 5 inner packs, so all packs contain 10 units which may be broken apart and shipped in pairs. The cost of handling an outer pack or an inner pack is $1.00. While it may seem counter-intuitive for the cost to be the same for handling either an outer or an inner, it is just an indication of the preference for shipping full outer packs. In this example, there are 958 stores, and the store size quantities are distributed among one of the following profiles.

TABLE 16

Store Demand Profiles

| Size | Profile 0 | Profile 1 | Profile 2 | Profile 3 | Profile 4 | Profile 5 | Profile 6 |
|---|---|---|---|---|---|---|---|
| S | 0.1154 | 0.0887 | 0.1099 | 0.0753 | 0.0810 | 0.0690 | 0.1023 |
| M | 0.2572 | 0.2424 | 0.2557 | 0.2303 | 0.2340 | 0.2130 | 0.2577 |
| L | 0.3176 | 0.3386 | 0.3349 | 0.3319 | 0.3567 | 0.3516 | 0.3177 |
| XL | 0.3095 | 0.3303 | 0.2994 | 0.3625 | 0.3283 | 0.3665 | 0.3223 |

Stores are associated with the demand profiles as follows.

TABLE 17

Stores Per Demand Profile

| Profile | Number of Stores |
|---|---|
| 0 | 1 |
| 1 | 240 |
| 2 | 166 |
| 3 | 158 |
| 4 | 150 |
| 5 | 135 |
| 6 | 108 |

The quantities are determined by taking a forecasted demand for a style/color and multiplying the forecasted demand by each size's profile percentage. The following table depicts the planned quantities for a subset of the stores.

TABLE 18

Example Demand for Certain Stores

| Store | Small | Medium | Large | X-Large |
|---|---|---|---|---|
| 1 | 0.02 | 1.45 | 5.18 | 2.28 |
| 2 | −0.35 | 2.6 | 5.54 | 3.56 |
| 3 | 0.42 | 0.54 | 3.08 | 2.79 |
| 4 | −0.03 | −0.72 | 0.96 | 0.06 |
| 5 | −0.01 | 4.33 | 3.02 | 1.13 |
| 6 | 1.24 | 2.44 | 3.75 | 3.82 |

Note that a negative demand is valid and indicates that the store is already over-stocked for a particular size. When there are excess units to allocate, it may be preferable to give an additional unit to a store that has no demand (a demand of 0 units) rather than a store with negative demand.

The store planned quantities are small compared to the pack sizes. The problem essentially breaks down into the decision of whether to send each size, in increments of 2 units, to a store or not. There are no constraints (e.g., pack type constraints or display quantity constraints within each store) in the example aside from the constraint on the quantity of each pack available for allocation. There are 11 distribution centers in the example, and the pack quantities are known at the vendor, meaning packs have not yet shipped to each distribution center. Thus, this is a DC-Split allocation. The following table depicts the amount of product available for delivery from the vendor.

TABLE 19

Vendor Delivery Amounts

| Pack | Allocation Quantity (outer packs) | Allocation Quantity (units) |
|---|---|---|
| Pack 1 (S) | 77 | 770 |
| Pack 2 (M) | 153 | 1530 |
| Pack 3 (L) | 270 | 2700 |
| Pack 4 (XL) | 270 | 2700 |

The total number of units demanded at each store, by size, is as follows. These totals do not include negative demand.

TABLE 20

Demand Across All Stores

| Size | Total Demand |
|---|---|
| S | 762.12 |
| M | 1526.6 |
| L | 2695.85 |
| XL | 2695.89 |

The pack distribution engine determines the adjustments that must be made to compensate for the difference between the expected quantities and the available quantities from the vendor.

TABLE 21

Differences Between Expected Quantities and Available Quantities

| Pack | Quantity Desired before Rounding | Divergence from Allocation Quantity |
|---|---|---|
| 1 | 65 | Must add 60 inners |
| 2 | 144 and 2/5 inners | Must add 43 inners |
| 3 | 257 and 4/5 inners | Must add 61 inners |
| 4 | 261 | Must add 45 inners |

After meeting the constraints at the vendor in terms of packs available to allocate, inner packs may be exchanged among distribution centers to make each pack whole at each distribution center. The pack distribution engine generates the following solution for a DC-Split operation (only 5 distribution centers shown).

TABLE 22

Mismatches

| Distribution Center | Size | Total Demand | Quantity Received | Handling Cost | Total Quantity Over | Total Quantity Under |
|---|---|---|---|---|---|---|
| 1 | S  | 64.58  | 70  | 35  | 40.51  | 12.09 |
| 1 | M  | 115.89 | 110 | 55  | 58.08  | 17.51 |
| 1 | L  | 225.92 | 230 | 115 | 37.04  | 17.18 |
| 1 | XL | 220.9  | 220 | 110 | 34.84  | 20.02 |
| 2 | S  | 95.12  | 100 | 50  | 59.38  | 17.02 |
| 2 | M  | 233.58 | 230 | 115 | 77.51  | 26.57 |
| 2 | L  | 346.1  | 350 | 175 | 55.1   | 24.67 |
| 2 | XL | 395.64 | 390 | 195 | 56.94  | 31.05 |
| 3 | S  | 66.65  | 60  | 30  | 38.46  | 18.59 |
| 3 | M  | 119.85 | 130 | 65  | 77.64  | 10.26 |
| 3 | L  | 194.72 | 190 | 95  | 40.45  | 22.27 |
| 3 | XL | 204.77 | 210 | 105 | 48.05  | 16.57 |
| 4 | S  | 52     | 50  | 25  | 55.94  | 14.05 |
| 4 | M  | 106.49 | 100 | 50  | 107.48 | 16.36 |
| 4 | L  | 186.79 | 190 | 95  | 52.7   | 18.94 |
| 4 | XL | 167.89 | 180 | 90  | 74.6   | 14.61 |
| 5 | S  | 88.51  | 80  | 40  | 18.55  | 24.91 |
| 5 | M  | 184.94 | 180 | 90  | 21.82  | 24.28 |
| 5 | L  | 410.47 | 420 | 210 | 30.13  | 20.6  |
| 5 | XL | 384.38 | 380 | 190 | 19.53  | 23.91 |

TABLE 23

Total Costs for Distribution Center Split Operation

| Total Handling Cost | Total Mismatch Cost | Total Cost of the Solution |
|---|---|---|
| 3826 | 19556.32 | 23382.32 |

Figure 13A:
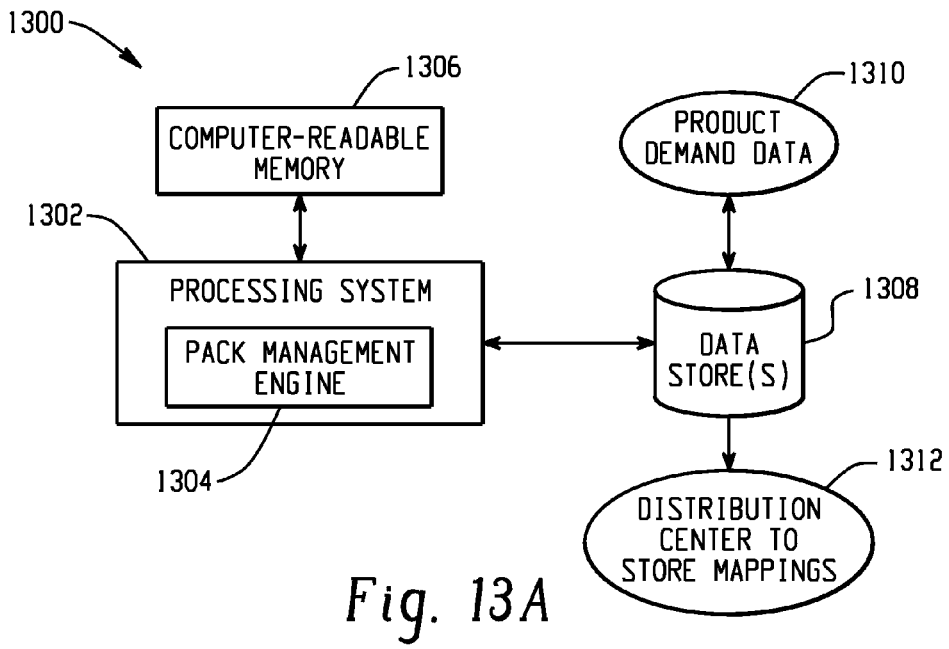
FIGS. 13A, 13B, and 13C depict example systems for implementing a pack management engine.
Figure 13B:
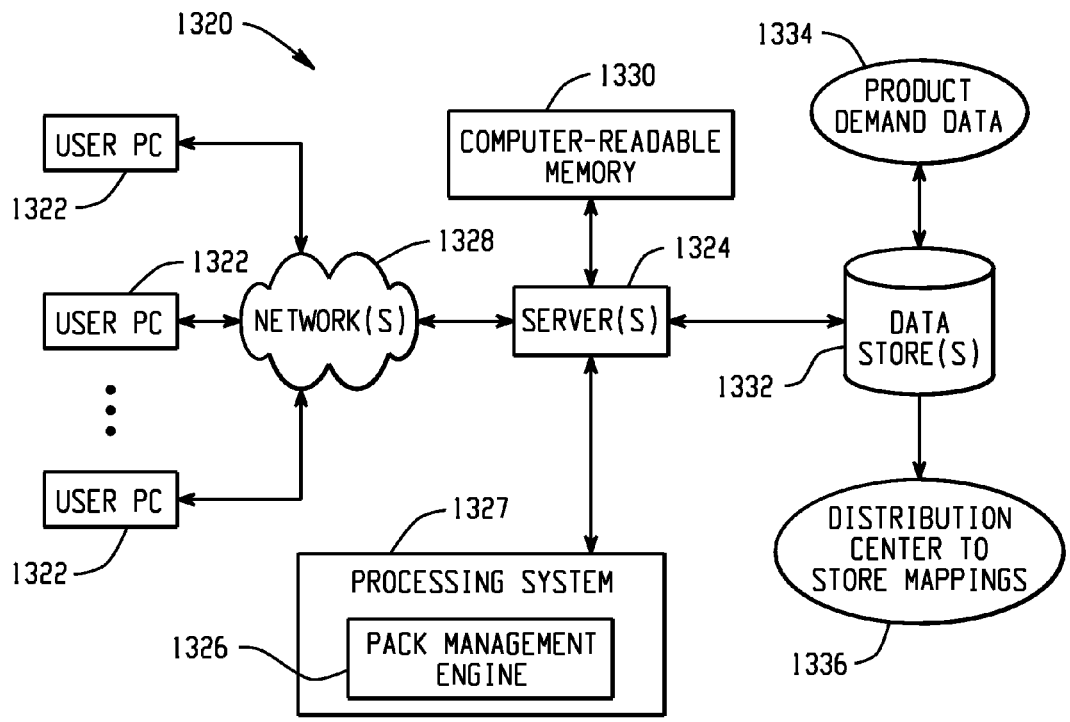
Figure 13C:
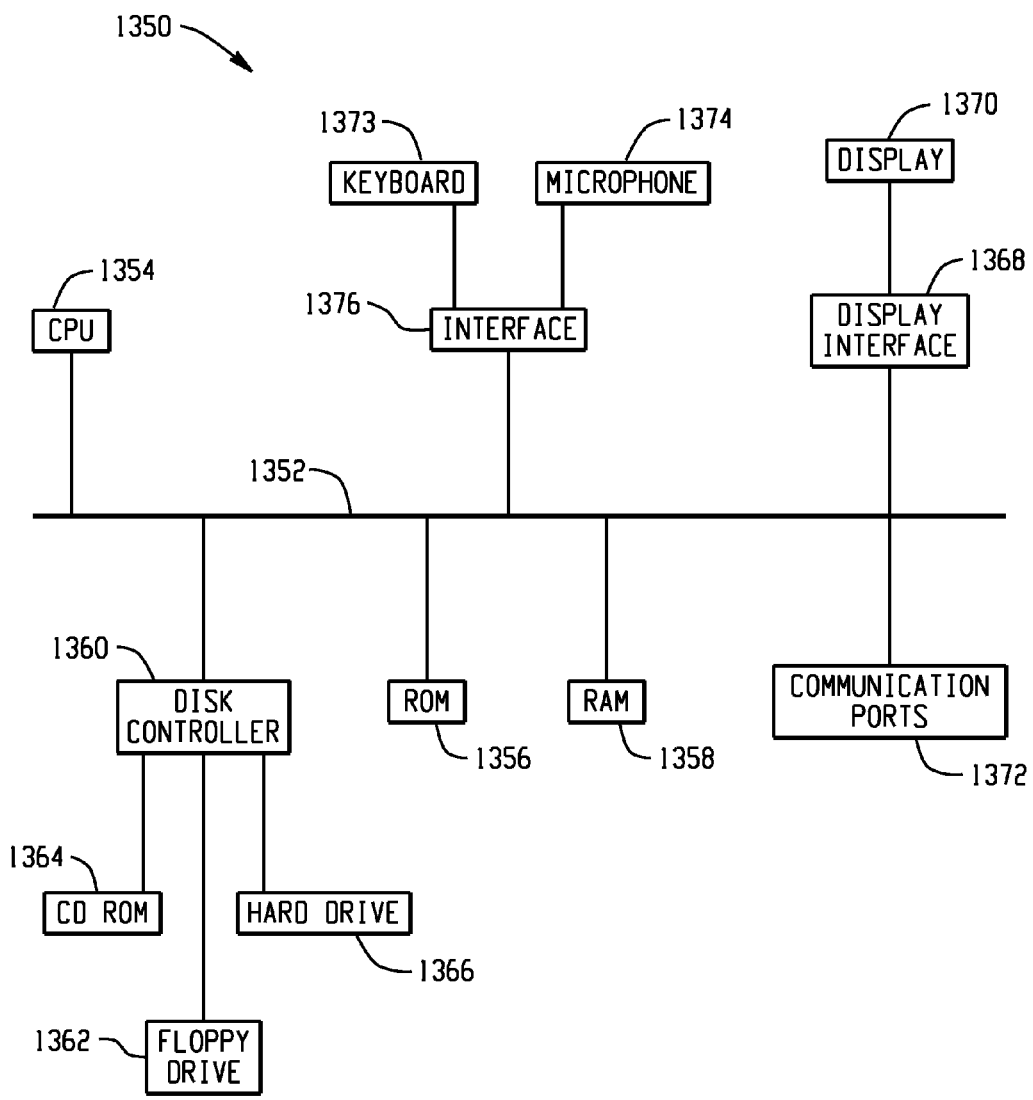

FIGS. 13A, 13B, and 13C depict example systems for implementing a pack management engine. For example, FIG. 13A depicts an exemplary system 1300 that includes a standalone computer architecture where a processing system 1302 (e.g., one or more computer processors) includes a pack management engine 1304 being executed on it. The processing system 1302 has access to a computer-readable memory 1306 in addition to one or more data stores 1308. The one or more data stores 1308 may contain product demand data 1310 as well as distribution center to store mappings 1312.

FIG. 13B depicts a system 1320 that includes a client server architecture. One or more user PCs 1322 accesses one or more servers 1324 running a pack management engine 1326 on a processing system 1327 via one or more networks 1328. The one or more servers 1324 may access a computer readable memory 1330 as well as one or more data stores 1332. The one or more data stores 1332 may contain product demand data 1334 as well as distribution center to store mappings 1336.

FIG. 13C shows a block diagram of exemplary hardware for a standalone computer architecture 1350, such as the architecture depicted in FIG. 13A, that may be used to contain and/or implement the program instructions of system embodiments described herein. A bus 1352 may serve as the information highway interconnecting the other illustrated components of the hardware. A processing system 1354 labeled CPU (central processing unit) (e.g., one or more computer processors), may perform calculations and logic operations required to execute a program. A processor-readable storage medium, such as read only memory (ROM) 1356 and random access memory (RAM) 1358, may be in communication with the processing system 1354 and may contain one or more programming instructions for implementing a pack management engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1360 interfaces with one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1352 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

While examples have been used to disclose the invention, including the best mode, and also to enable any person skilled in the art to make and use the invention, the patentable scope of the invention is defined by claims, and may include other examples that occur to those of ordinary skill in the art. Accordingly the examples disclosed herein are to be considered non-limiting.

It is further noted that the systems and methods may be implemented on various types of computer architectures, such as for example on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

In multiple computer or processor systems, data signals may be conveyed via networks (e.g., local area network, wide area network, internet, combinations thereof, etc.), fiber optic medium, carrier waves, wireless networks, etc. for communication among multiple computers or computing devices. Data signal(s) can carry any or all of the data disclosed herein that is provided to or from a device.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand. It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method comprising:
    accessing, on a computing device, inner pack configuration information depicting contents of multiple commonly-configured inner packs, wherein the inner packs are used to provide multiple varieties of a product to multiple stores, the stores including stores supplied by a first distribution center and stores supplied by a second distribution center, wherein depicting the contents includes depicting a quantity of each variety of the product in the inner packs, and wherein the inner packs are shipped in outer packs, the outer packs being sized to contain a first number of inner packs;
    for each of the stores, accessing mismatch cost data;
    for each of the stores, accessing a demand profile, wherein a demand profile for a store depicts demand for each of the multiple varieties of the product at that store;
    repeatedly performing a series of operations on the computing device until an allocation condition is satisfied, the allocation condition becoming satisfied when:
        the stores supplied by the first distribution center are allocated, in the aggregate, a first quantity of inner packs such that the first quantity is a multiple of the first number of inner packs; and
        concurrently, the stores supplied by the second distribution center are allocated, in the aggregate, a second quantity of inner packs such that the second quantity is a multiple of the first number of inner packs,
    wherein the series of operations includes:
        accessing allocation data for each of the stores, wherein allocation data for a store depicts an allocation quantity of inner packs for that store,
        calculating, on the computing device, a mismatch cost for each of the stores, wherein calculating a mismatch cost for a store is based on the allocation quantity, mismatch cost data and demand profile for that store, and the accessed inner pack configuration information,
        determining a first marginal mismatch cost for each of the stores supplied by the first distribution center, wherein, with respect to each store, the first marginal mismatch cost is associated with decreasing the allocation quantity of inner packs for the respective store;
        determining a second marginal mismatch cost for each of the stores supplied by the second distribution center, wherein, with respect to each store, the second marginal mismatch cost is associated with increasing the allocation quantity of inner packs for the respective store;
        selecting one of the stores for allocation reduction, wherein the store selected for allocation reduction is the store for which the first marginal mismatch cost is lowest,
        selecting another one of the stores for allocation expansion, wherein the store selected for allocation expansion is the store for which the second marginal mismatch cost is lowest, and
        subtracting one inner pack from the allocation quantity of inner packs for the store selected for allocation reduction; and
        adding one inner pack to the allocation quantity of inner packs for the store selected for allocation expansion; and
    subsequent to determining that the allocation condition has been satisfied, initiating a shipment to each of the stores, wherein, for each store, the respective shipment is based on the allocation quantity of inner packs for that store.

2. The method of claim 1, wherein mismatch cost data for a store includes information depicting:
    overdelivery costs incurred by the store, the overdelivery costs including separate costs for each variety of the product; and
    underdelivery costs incurred by the store, the underdelivery costs including separate costs for each variety of the product.

3. The method of claim 1, wherein inner packs are shipped to the stores in commonly-configured outer packs, each outer pack containing a same quantity of inner packs.

4. A system, comprising:
    one or more processing units;
    one or more non-transitory computer-readable storage mediums containing instructions configured to cause the one or more processing units to perform steps including:
    accessing inner pack configuration information depicting contents of multiple commonly-configured inner packs, wherein the inner packs are used to provide multiple varieties of a product to multiple stores, the stores including stores supplied by a first distribution center and stores supplied by a second distribution center, wherein depicting the contents includes depicting a quantity of each variety of the product in the inner packs, and wherein the inner packs are shipped in outer packs, the outer packs being sized to contain a first number of inner packs;
    for each of the stores, accessing mismatch cost data;

for each of the stores, accessing a demand profile, wherein a demand profile for a store depicts demand for each of the multiple varieties of the product at that store;

repeatedly performing a series of operations until an allocation condition is satisfied, the allocation condition becoming satisfied when:
  the stores supplied by the first distribution center are allocated, in the aggregate, a first quantity of inner packs such that the first quantity is a multiple of the first number of inner packs; and
  concurrently, the stores supplied by the second distribution center are allocated, in the aggregate, a second quantity of inner packs such that the second quantity is a multiple of the first number of inner packs, wherein the series of operations includes:
  accessing allocation data for each of the stores, wherein allocation data for a store depicts an allocation quantity of inner packs for that store,
  calculating a mismatch cost for each of the stores, wherein calculating a mismatch cost for a store is based on the allocation quantity, mismatch cost data and demand profile for that store, and the accessed inner pack configuration information,
  determining a first marginal mismatch cost for each of the stores supplied by the first distribution center, wherein, with respect to each store, the first marginal mismatch cost is associated with decreasing the allocation quantity of inner packs for the respective store;
  determining a second marginal mismatch cost for each of the stores supplied by the second distribution center, wherein, with respect to each store, the second marginal mismatch cost is associated with increasing the allocation quantity of inner packs for the respective store;
  selecting one of the stores for allocation reduction, wherein the store selected for allocation reduction is the store for which the first marginal mismatch cost is lowest,
  selecting another one of the stores for allocation expansion, wherein the store selected for allocation expansion is the store for which the second marginal mismatch cost is lowest, and
  subtracting one inner pack from the allocation quantity of inner packs for the store selected for allocation reduction; and
  adding one inner pack to the allocation quantity of inner packs for the store selected for allocation expansion; and subsequent to determining that the allocation condition has been satisfied, initiating a shipment to each of the stores, wherein, for each store, the respective shipment is based on the allocation quantity of inner packs for that store.

5. The system of claim 4, wherein mismatch cost data for a store includes information depicting:
  overdelivery costs incurred by the store, the overdelivery costs including separate costs for each variety of the product; and
  underdelivery costs incurred by the store, the underdelivery costs including separate costs for each variety of the product.

6. The system of claim 4, wherein inner packs are shipped to the stores in commonly-configured outer packs, each outer pack containing a same quantity of inner packs.

7. A computer-program product, tangibly embodied in a machine-readable non-transitory storage medium, including instructions configured to cause a data processing apparatus to perform steps including:

accessing inner pack configuration information depicting contents of multiple commonly-configured inner packs, wherein the inner packs are used to provide multiple varieties of a product to multiple stores, the stores including stores supplied by a first distribution center and stores supplied by a second distribution center, wherein depicting the contents includes depicting a quantity of each variety of the product in the inner packs, and wherein the inner packs are shipped in outer packs, the outer packs being sized to contain a first number of inner packs;

for each of the stores, accessing mismatch cost data;

for each of the stores, accessing a demand profile, wherein a demand profile for a store depicts demand for each of the multiple varieties of the product at that store;

repeatedly performing a series of operations until an allocation condition is satisfied, the allocation condition becoming satisfied when:
  the stores supplied by the first distribution center are allocated, in the aggregate, a first quantity of inner packs such that the first quantity is a multiple of the first number of inner packs; and
  concurrently, the stores supplied by the second distribution center are allocated, in the aggregate, a second quantity of inner packs such that the second quantity is a multiple of the first number of inner packs, wherein the series of operations includes:
  accessing allocation data for each of the stores, wherein allocation data for a store depicts an allocation quantity of inner packs for that store,
  calculating a mismatch cost for each of the stores, wherein calculating a mismatch cost for a store is based on the allocation quantity, mismatch cost data and demand profile for that store, and the accessed inner pack configuration information,
  determining a first marginal mismatch cost for each of the stores supplied by the first distribution center, wherein, with respect to each store, the first marginal mismatch cost is associated with decreasing the allocation quantity of inner packs for the respective store;
  determining a second marginal mismatch cost for each of the stores supplied by the second distribution center, wherein, with respect to each store, the second marginal mismatch cost is associated with increasing the allocation quantity of inner packs for the respective store;
  selecting one of the stores for allocation reduction, wherein the store selected for allocation reduction is the store for which the first marginal mismatch cost is lowest,
  selecting another one of the stores for allocation expansion, wherein the store selected for allocation expansion is the store for which the second marginal mismatch cost is lowest, and
  subtracting one inner pack from the allocation quantity of inner packs for the store selected for allocation reduction; and
  adding one inner pack to the allocation quantity of inner packs for the store selected for allocation expansion; and subsequent to determining that the allocation condition has been satisfied, initiating a shipment to each of the stores, wherein, for each store, the respective shipment is based on the allocation quantity of inner packs for that store.

8. The computer-program product of claim 7, wherein mismatch cost data for a store includes information depicting:
- overdelivery costs incurred by the store, the overdelivery costs including separate costs for each variety of the product; and
- underdelivery costs incurred by the store, the underdelivery costs including separate costs for each variety of the product.

9. The computer-program product of claim 7, wherein inner packs are shipped to the stores in commonly-configured outer packs, each outer pack containing a same quantity of inner packs.

10. The method of claim 1, wherein each first marginal mismatch cost is an expected cost increase associated with decrementing an inner pack allocation quantity by an amount of one inner pack.

11. The method of claim 1, wherein each second marginal mismatch cost is an expected cost increase associated with incrementing an inner pack allocation quantity by an amount of one inner pack.

12. The method of claim 1, wherein, prior to the repeated performance of the operations, constraints are imposed on at least two of the stores, and wherein the repeated performance of the operations is used to reallocate inner packs amongst the stores so that the constraints are not violated.

13. The method of claim 3, wherein, after the repeated performance of the operations, each allocation quantity of inner packs is a multiple of the quantity of inner packs contained in each outer pack.

14. The system of claim 4, wherein each first marginal mismatch cost is an expected cost increase associated with decrementing an inner pack allocation quantity by an amount of one inner pack.

15. The system of claim 4, wherein each second marginal mismatch cost is an expected cost increase associated with incrementing an inner pack allocation quantity by an amount of one inner pack.

16. The system of claim 4, wherein, prior to the repeated performance of the operations, constraints are imposed on at least two of the stores, and wherein the repeated performance of the operations is used to reallocate inner packs amongst the stores so that the constraints are not violated.

17. The system of claim 6, wherein, after the repeated performance of the operations, each allocation quantity of inner packs is a multiple of the quantity of inner packs contained in each outer pack.

18. The computer-program product of claim 7, wherein each first marginal mismatch cost is an expected cost increase associated with decrementing an inner pack allocation quantity by an amount of one inner pack.

19. The computer-program product of claim 7, wherein each second marginal mismatch cost is an expected cost increase associated with incrementing an inner pack allocation quantity by an amount of one inner pack.

20. The computer-program product of claim 7, wherein, prior to the repeated performance of the operations, constraints are imposed on at least two of the stores, and wherein the repeated performance of the operations is used to reallocate inner packs amongst the stores so that the constraints are not violated.

21. The computer-program product of claim 9, wherein, after the repeated performance of the operations, each allocation quantity of inner packs is a multiple of the quantity of inner packs contained in each outer pack.

* * * * *